United States Patent
Mladin et al.

(10) Patent No.: US 12,192,295 B2
(45) Date of Patent: *Jan. 7, 2025

(54) ENHANCED RESTFUL OPERATIONS

(71) Applicant: Convida Wireless, LLC, Wilmington, DE (US)

(72) Inventors: Catalina Mihaela Mladin, Hatboro, PA (US); Qing Li, Princeton Junction, NJ (US); Rocco Di Girolamo, Laval (CA); Chonggang Wang, Princeton, NJ (US); William Robert Flynn, IV, Schwenksville, PA (US); Hongkun Li, Malvern, PA (US); Xu Li, Plainsboro, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,239

(22) Filed: Aug. 24, 2023

(65) Prior Publication Data

US 2023/0403334 A1 Dec. 14, 2023

Related U.S. Application Data

(63) Continuation of application No. 17/643,484, filed on Dec. 9, 2021, now Pat. No. 11,778,056, which is a (Continued)

(51) Int. Cl.
*H04L 67/51* (2022.01)
*H04L 67/02* (2022.01)
(Continued)

(52) U.S. Cl.
CPC ............. *H04L 67/51* (2022.05); *H04L 67/02* (2013.01); *H04L 67/133* (2022.05);
(Continued)

(58) Field of Classification Search
None
See application file for complete search history.

(56) References Cited

U.S. PATENT DOCUMENTS

| 11,019,155 B2 | 5/2021 | Mladin et al. |
| 2002/0161883 A1 | 10/2002 | Matheny et al. |

(Continued)

FOREIGN PATENT DOCUMENTS

| CN | 101957847 A | 1/2011 |
| CN | 102255969 A | 11/2011 |

(Continued)

OTHER PUBLICATIONS

U.S. Appl. No. 17/643,484, filed Dec. 9, 2021.
(Continued)

*Primary Examiner* — Lashonda Jacobs-Burton
(74) *Attorney, Agent, or Firm* — BakerHostetler

(57) ABSTRACT

A batch of CRUD operations can be coupled with the resource discovery operation and directly conducted on the matched resources, without initiating new CRUD requests. New functionality at the Originator and Receiver can differentiate the resources for which criteria matching is applied from the resources included in the discovery/filtering results. Enhanced functionality at the Originator and Receiver can combine discovery with RESTful operations targeting a resource set different than but related the discovered resources. Other enhancements may be used to request discovery of resources in a specified relationship to those matching a filter, or to request group formation based on the result.

12 Claims, 20 Drawing Sheets

Related U.S. Application Data continuation of application No. 17/245,246, filed on Apr. 30, 2021, now Pat. No. 11,228,652, which is a continuation of application No. 15/762,263, filed as application No. PCT/US2016/053342 on Sep. 23, 2016, now Pat. No. 11,019,155.

(60) Provisional application No. 62/222,536, filed on Sep. 23, 2015.

(51) Int. Cl.
*H04L 67/133* (2022.01)
*H04L 67/566* (2022.01)
*H04L 67/60* (2022.01)
*H04W 4/70* (2018.01)

(52) U.S. Cl.
CPC ............ *H04L 67/566* (2022.05); *H04L 67/60* (2022.05); *H04W 4/70* (2018.02)

(56) References Cited

U.S. PATENT DOCUMENTS

| | | | |
|---|---|---|---|
| 2008/0201338 A1 | 8/2008 | Castro et al. | |
| 2013/0203394 A1 | 8/2013 | Dong et al. | |
| 2014/0215043 A1 | 7/2014 | Ryu et al. | |
| 2015/0029894 A1* | 1/2015 | Lu | H04W 4/70 370/259 |
| 2015/0055557 A1 | 2/2015 | Dong et al. | |
| 2015/0055640 A1* | 2/2015 | Wang | H04W 88/16 370/338 |
| 2015/0143472 A1* | 5/2015 | Kim | H04W 12/069 726/4 |
| 2015/0205834 A1 | 7/2015 | Keeton et al. | |
| 2015/0373127 A1* | 12/2015 | Ly | H04L 67/51 709/217 |
| 2016/0085862 A1 | 3/2016 | Baldwin et al. | |
| 2017/0099562 A1 | 4/2017 | Bhalla | |
| 2017/0134427 A1* | 5/2017 | Hutchins | H04L 63/20 |
| 2018/0234908 A1 | 8/2018 | Di et al. | |
| 2023/0114953 A1* | 4/2023 | Arumugam | G06F 9/5072 718/100 |

FOREIGN PATENT DOCUMENTS

| | | |
|---|---|---|
| CN | 103200209 A | 7/2013 |
| CN | 103279573 A | 9/2013 |
| CN | 108141468 A | 6/2018 |
| GB | 2530499 A | 3/2016 |
| JP | 2015-119901 A | 7/2015 |
| TW | 201404098 A | 1/2014 |
| WO | 2014/185754 A1 | 11/2014 |
| WO | 2015/119901 A1 | 8/2015 |

OTHER PUBLICATIONS

U.S. Appl. No. 17/245,246, filed Apr. 30, 2021.
U.S. Appl. No. 15/762,263, filed Mar. 22, 2018.
Co-Rapporteurs et al., "OneM2M Service Layer Protocol Core Specification", Draft TS-0004 v0.5.6, pro-2014-0402R01-draft _ Ts-0004_ V0_5_6.zip, ONEM2M, vol. WG3—Protocols, PRO, No. conference = PRO 12, Jul. 28, 2014-Aug. 1, 2014, France, Sophia Antipolis Jul. 31, 2014, pp. 1-148, XP084007 409.
OneM2M TS-0001 V2.3.0, "Functional Architecture" Aug. 7, 2015, 352 pages.
OneM2M TS-0004 V1.0.0, "Service Layer Core Protocol Specification", Jan. 30, 2015.
OneM2M TS-0007 V0.3.0, "Service Component Architecture", Jun. 27, 2014, 105 pages.
OneM2M White Paper, "The Interoperability Enabler for the Entire M2M and IoT Ecosystem", Jan. 2015, 14 pages.
Yong. C. et al., One Network Resource Sharing Architecture of Traditional Chinese Medicine Industry, World Science and Technology—Modernization of Traditional Chinese Medicine and Materia Medica, vol. 15, Issue 8, 1853-1859, 2013 (with English abstract).

\* cited by examiner

ENHANCED RESTFUL OPERATIONS

CROSS-REFERENCE TO RELATED APPLICATIONS

This Application is a continuation of U.S. patent application Ser. No. 17/643,484, filed on Dec. 9, 2021, now U.S. Pat. No. 11,778,056, which is a continuation of U.S. patent application Ser. No. 17/245,246, filed on Apr. 30, 2021, now U.S. Pat. No. 11,228,652, which is a continuation of U.S. patent application Ser. No. 15/762,263, filed Mar. 22, 2018, now U.S. Pat. No. 11,019,155, which is a National Stage Application filed under 35 U.S.C. § 371 of International Application No. PCT/US2016/053342 filed Sep. 23, 2016, and which claims the benefit of U.S. Provisional Patent Application Ser. No. 62/222,536, filed Sep. 23, 2015, the disclosures of which are hereby incorporated by reference as if set forth in their entireties.

BACKGROUND

In recent years M2M solutions enabling machines/devices to communicate with each other have been developed for the healthcare sector, the energy sector, and the automotive sector. The next step of optimization is to provide solutions integrating machines and things from different sectors on the same platforms.

For this purpose, a single set of standards defining a horizontal platform for the exchange and the sharing of data among applications independent of industry sectors has been initiated by oneM2M. "oneM2M is creating a distributed software layer—like an operating system—which is facilitating that unification by providing a framework for interworking with different technologies." (quoted from "The Interoperability Enabler for the Entire M2M and IoT Ecosystem", OneM2M White paper) This distributed software layer is implemented in a common service layer that sits between the M2M applications at application layer 104 and the communication hardware/software that provides data transport at the network services layer 106 (See FIG. 1).

The Service Layer 106 is enabled functionally by Common Services Functions (CSFs). A group of CSFs may be instantiated as a group on Common Services Entities (CSEs). An example CSE 202 is shown in FIG. 2. Examples of CSFs are described in the following paragraphs.

Application and Service Layer Management CSF 204 provides management of AEs and CSEs. This includes capabilities to configure, troubleshoot and upgrade functions of the CSE, as well as to upgrade the AEs Discovery CSF 206 searches for information about applications and services based on a filter criteria. Additional information on this CSF is described below.

Registration CSF 208 provides the functionality for AEs (or other remote CSEs) to register with a CSE. This allows the AEs (or the remote CSE) to use the services of the CSE.

Communication Management/Delivery Handling CSF 210 provides communications with other CSEs, AEs and NSEs. This CSF decides at what time and which communication connection for delivering communications and if necessary and allowed, to buffer communications request so that they can be forwarded at a later time.

Group Management CSF 212 provides for the handling of group related requests. Enables an M2M system to support bulk operations on multiple devices, applications, etc.

Security CSF 214 provides security functions for the service layer, such as access control including identification, authentication, and authorization.

Data Management and Repository CSF 216 provides data storage and mediation functions (collecting data for aggregation, re-formatting data, and storing data for analytics and semantic processing).

Location CSF 218 provides the functionality to enable AEs to obtain geographical location information.

Service Charging & Accounting CSF 220 provides charging functions for the service layer Device Management CSF 224 provides management of device capabilities on M2M gateways and M2M devices.

Network Service Exposure, Service Execution and Triggering CSF 226 manages communications with the Underlying Networks for accessing network service functions Subscription and Notification CSF 228 provides functionality to allow for subscribing to an event and to be notified when this event occurs.

The oneM2M architecture provides for a CSE 202 to interface through the Mca, Mcc (and Mcc'), and Mcn reference points (respectively) with Application Entities (AE) 230; other CSEs; and Network Service Entity (NSE) 232, i.e. the underlying network.

oneM2M uses two architectural approaches to develop the service layer architectural specifications: Resource Oriented Architecture (ROA) shown in FIG. 3A and Service Oriented Architecture (SOA) shown in FIG. 3B.

The ROA architecture is detailed in oneM2M-TS-0001, oneM2M Functional Architecture V2.1.0. It is developed around resources and the operations performed by CSFs to enable their functionality. Resources are architectural elements uniquely addressable via Uniform Resource Identifiers (URIs).

Resources may be viewed as a hierarchical trees, emanating from a base, with a number of relationships defined among them. For example, a resource may contain child resource(s) and attribute(s), the child resource having a containment relationship with a parent resource. Therefore, the parent resource representation contains references to its child resources(s). The lifetime of a child-resource is limited by the parent's resource lifetime.

Attributes are architectural elements that store information of the resource. oneM2M defines a set of attributes common to all resources, and others are specific to individual resources and are referred to as "resource specific attributes". Resources located at one CSE (referred to as Hosting CSE) may be announced to remote CSEs, and these are referred to "announced resources." The announced resources may contain attributes of the original resource as well as their own attributes. Synchronization between the original resource and the announced resource, is the responsibility of the Hosting CSE.

The SOA architecture is detailed in oneM2M-TS-0007, Service Component Architecture V0.8.1. It is developed around the services themselves and may be used in legacy deployments that are not RESTful based. The SOA service layer contains various M2M services which may be grouped into service components. In addition to the existing reference points introduced in the ROA architecture, the SOA architecture introduces the inter-service reference point Msc.

The general flow that governs the information exchange in oneM2M is described in oneM2M-TS-0001, oneM2M Functional Architecture V2.1.0 and is based on the use of Request and Response messages within a communication procedure shown in FIG. 4. An originator 402 sends a request message to receiver 404 and the receiver 404 responds with response message.

This procedure applies to communications between AEs and a CSE (over the Mca reference point) as well as among CSEs (over the Mcc reference point). Depending on the operation carried by the messages, these procedures may manipulate information in standardized resource representations via RESTful methods such as CREATE, RETRIEVE, UPDATE, and DELETE.

Both the request and response messages are specified, and contain mandatory, optional or conditional parameters. Table 1 is a list of request parameters with brief descriptions, full descriptions can be found in oneM2M-TS-0001, oneM2M Functional Architecture V2.1.0.

TABLE 1

Request Parameter List

| Request Parameter | Criticality | Description |
| --- | --- | --- |
| To | Mandatory | Address of the target resource or target attribute for the operation |
| From | Mandatory | Identifier representing the Originator |
| Operation | Mandatory | Operation to be executed: Create (C), Retrieve (R), Update (U), Delete (D), Notify (N). |
| Request Identifier | Mandatory | ID enabling tracking of Requests and corresponding Responses |
| Content | Conditional based on Operation: Mandatory for C, U, N Optional for R | (C) content of the new resource to be created (U) content to be replaced in an existing resource (N) notification information Optional for: (R) list of attributes to be retrieved |
| Resource type | Conditional, Mandatory only for C | Resource type for the resource to be created. |
| Role | Optional | Originator role to be used in role based access control |
| Originating Timestamp | Optional | Originating timestamp of when the message was built. |
| Request Expiration Timestamp | Optional | Indicates when the request messages (including delay-tolerant) should expire |
| Response Expiration Timestamp | Optional | Indicates when the response messages (including delay-tolerant) should expire |
| Response type | Optional | Indicates what type of response shall be used. Options are: nonBlockingRequestSynch, nonBlockingRequestAsynch, blockingRequest |
| Result Content | Optional | Indicates what the expected components of the result are. Options are: attributes, hierarchical-address, hierarchical-address + attributes, attributes + child-resources, child-resources, attributes + child-resource-references, child-resource-references, nothing, original-resource |
| Result Persistence | Optional | Indicates the duration for which the address containing the responses is to persist. |
| Operation Execution Time | Optional | Indicates the time when the specified operation is to be executed by the target CSE |
| Event Category | Optional | Indicates the event category that should be used to handle this request in transit, such as: immediate, bestEffort, latest |
| Delivery Aggregation | Optional | Enables aggregation of one or more request for delivery to the same CSE(s), depending on policies |
| Group Request Identifier | Optional | Identifier optionally added to group requests that is to be fanned out, in order to detect loops and avoid duplicated operations. |
| Filter Criteria | Optional | Conditions for filtered retrieve operation are described in the next section it is used for resource discovery and general retrieve, update, delete requests. |
| Discovery Result Type | Optional | Indicates the preference of the Originator for the format of returned information in the result of the operation. Options are: Hierarchical addressing, non-Hierarchical addressing |

The use of some of the request parameters above, which play an important role in discovery operations, is detailed in the following section.

Similarly, the table 2 provides a list of response parameters with brief descriptions, full descriptions can be found in oneM2M-TS-0001, oneM2M Functional Architecture V2.1.0.

(oneM2M Functional Architecture V2.1.0). However, we distinguish here between filter criteria provided for matching and those with other, such as specifying the type of criteria usage, or the way the results are returned. These parameters may be combined by relational operations to create compound search criteria.

TABLE 2

Response Parameter List

| Response message parameter/success or not | Response: Code = Ack | Response Code = successful: Operation = Create | Response Code = successful Operation = Retrieve | Response Code = successful: Operation = Update | Response Code = successful Operation = Delete | Response Code = successful Operation = Notify | Response Code = unsuccessful Operation = C, R, U, D or N |
|---|---|---|---|---|---|---|---|
| Response Code - successful, unsuccessful, ack | M | M | M | M | M | M | M |
| Request Identifier - uniquely identifies a Request message | M | M | M | M | M | M | M |
| Content - to be transferred | O (address of <request> resource for a non-blocking request) | O (The address and/or the content of the created resource) | M (the retrieved resource content or aggregated contents of discovered resources) | O (The modified attributes either updated, deleted or new) | O (The content actually deleted) | N/A | O (Additional error info) |
| To - the identifier of the Originator or the Transit CSE (non-blocking request) | | O | O | O | O | O | O |
| From - the identified of the Receiver | O | O | O | O | O | O | O |
| Originating Timestamp - when the message was built | O | O | O | O | O | O | O |
| Result Expiration Timestamp - when the message expires | O | O | O | O | O | N/A | O |
| Event Category - what event category shall be used for the response message | O | O | O | O | O | O | O |
| Status Code - (e.g. authorization timeout, etc.) | O | O | O | O | O | O | O |

Resource discovery is a process by which an entity (referred to as the Originator 402) searches for information about applications and services contained in attributes and resources. In oneM2M, the Originator 402 of a resource discovery can be either an AE or a CSE, and targets a root resource at a Receiver CSE 404' where the search is to start.

The content of the search result depends on some of the Filter Criteria by matching certain search parameters (e.g. based on resource type, resource creation time, resource size, etc.) . . . . Other Filter Criteria parameters (e.g. limit), along with some operation parameters (e.g. Discovery Result Type) play a role in the way the content of the search result is provided back to the Originator 402. The discovery operation, just like the CRUD ones, is subject to the access control policy at the Receiver CSE 404'—that is, does the Originator 402 have "DISCOVER" access rights.

The complete list of search parameters is provided in Table 3 and it is based on Table 8.1.2-1 in oneM2M-TS-0001

TABLE 3

Resource Discovery Filter Criteria

| Search Parameter | Resource matching if: |
|---|---|
| createdBefore | It was created before createdBefore |
| createdAfter | It was created after createdBefore |
| modifiedSince | It has been modified since modifiedSince |
| unmodifiedSince | It has not been modified since unmodifiedSince |
| stateTagSmaller | It has stateTag attribute smaller than stateTagSmaller |
| stateTagBigger | It has stateTag attribute larger than stateTagSmaller |
| expire Before | It has expirationTime attribute before expireBefore |
| expireAfter | It has expirationTime attribute after expireAfter |
| labels | It has labels attribute matching labels search parameter. The labels are tokens used as keys for discovery purposes |
| resourceType | It is of type resourceType |
| sizeAbove | The contentSize attribute of the <contentInstance> resource is equal to or greater than the sizeAbove value |

TABLE 3-continued

Resource Discovery Filter Criteria

| | |
|---|---|
| sizeBelow | The contentSize attribute of the <contentInstance> resource matches the contentType value |
| contentType | The contentInfo attribute of the <contentInstance> resource matches the contentType value |
| attribute | It has the corresponding matching resource attribute |
| Filter criteria (others) | Role: |
| limit | This parameter is not used as search criterion, rather as in formatting/limiting the way the search result is returned |
| filterUsage | This parameter is not used as search criterion, rather for indicating the use of the filter criteria for discovery purposes |

In oneM2M ROA the resource discovery is implemented using a RETRIEVE method, using filterUsage to indicate to the Receiver CSE 404' to distinguish between a resource discovery operation and a generic retrieve operation.

A generic resource discovery procedure is shown in FIG. 5. The Originator 402 issues the Resource Discovery Request (Step 001) to the Receiver CSE 404', targeting specific child resources of resource <CSEBase>/<aeO1>. The Receiver CSE 404' processes the request and returns the appropriate list of discovered resources. The Receiver CSE 404' may limit the discovery result according to the DISCOVER privileges of the discovered resources, and may change the filter criteria according to its own local policy. If the full list of discovered resources cannot be returned, the Receiver CSE 404' will warn the originator 402 (with a flag). The Resource Discovery Response (Step 003) includes a list of addresses of the resources that match the Filter Criteria. It is the responsibility of the Originator 402, if needed, to retrieve the resources pointed to by the addresses.

SUMMARY

Batches of CRUD operations can be coupled with the resource discovery operation and directly conducted on the resource discovery outcome, without initiating new CRUD requests.

New functionality at the Originator and Receiver can differentiate the resources for which criteria matching is applied from the resources included in the discovery/filtering results. An Originator can request that the resource discovery outcome be provided in a Filtering Result. The Filtering Result may be different than but related to the Matched Resource Set that fulfills Originator specified Filter Criteria. The relation between the resources in the Filtering Result and those in the Matched Resource Set can also be specified by the Originator.

Enhanced functionality at the Originator and Receiver can link RESTful and discovery operations. An Originator can request an operation on a Target Resource Set. The Target Resource Set may be different than but related to a set of discovered resources (Filtering Result) based on Originator discovery request. The relation between the resources in the Target Resource Set and those in the Filtering Result can also be specified by the Originator.

Enhanced Filter Criteria, such as to discover resources that have a parent or a child that match certain filter criteria, can be used.

Enhanced Filter Directives can for instance be used to request creation of a group for the resources matching the filter criteria, or to specify the relation between Filtering Result and Matched Resources.

Enhanced Exception Handling can for instance be used to change the Receiver behavior, including the CRUD operation to be performed, when certain conditions occur, based on Originator request.

The new parameters and processing of RESTful operations introduced can enable further new or enhanced functionality as follows:

- Ability to request resource discovery to be followed by a CREATE operation on the discovered resources, with processing only at the Receiver and without back and forth messaging between the Originator and Receiver
- Ability to request resource discovery to be followed by an UPDATE operation on the discovered resources with processing only at the Receiver and without back and forth messaging between the Originator and Receiver
- Ability to request resource discovery to be followed by a DELETE operation on the discovered resources with processing only at the Receiver and without back and forth messaging between the Originator and Receiver
- Ability to provide different targets for the discovery procedure and for the CRUD operation, although requested using the same message
- Ability to enhance the discovery operation or the filtering performed before CRUD operations, by using conditions to be matched at various levels of a resource tree
- Ability to specify a difference/relationship between resources which get matched based on given criteria and the resources composing the filtering/discovery result
- Ability to specify a difference/relationship between the resources composing the filtering/discovery result and those targeted by the CRUD operations, e.g. by using resource relationships such as Parent/Child, semantic descriptor, etc. in determining of the operation target from the filtering/discovery result.
- Ability to request the creation of a group consisting of the matched or filtered resources of a discovery operation.
- Ability to request changes in the operation to be performed when certain conditions/exceptions occur.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

ACP Access Control Policy
ASN Application Service Node
CRUD Create, Read, Update, and Delete
CSE Common Service Entity
CSF Common Service Function
DIS Discovery
DMR Data Management and Repository
HW/SW Hardware/Software
IN Infrastructure Node
IoT Internet of Things
M2M Machine-to-Machine
MN Middle Node
ROA Resource Oriented Architecture
SOA Service Oriented Architecture
URI Uniform Resource Identifier

| | Definitions |
|---|---|
| Common Service Entity (CSE) | oneM2M term for an instantiation of a set of Common Service Functions. |
| Common Service Function (CSF) | oneM2M term for a Service Capability. Capabilities/Functionalities that reside in the common Service Layer. |
| Hosting CSE | Can be CSE which hosts various resources (oneM2M name for a Hosting Node) |
| Hosting Node | Can be an M2M Service node which hosts various resources. The hosted resources can be accessed and subscribed by other M2M entities. |
| M2M Entities | Can be any node that participates in M2M communications, in both field and infrastructure domains |
| M2M Service Node | Can be a network node hosting a service layer supporting one or more service capabilities for M2M communication. |
| Middle Node CSE | Can be the CSE in a middle node. |
| Middle Node | Can be a node between a field domain M2M entity and an infrastructure node or entity |
| Originator | Can be the entity that initiates of a Request message for a RESTful operation. For example, the CSE where an Originator is trying to perform a resource discovery via RETRIEVE. |
| Service Capability | Can be a specific type of service supported by a service layer |
| Service Layer | Can be a software middleware layer that sits between M2M applications and communication HW/SW that provides data transport. It can provide commonly needed functions for M2M applications across different industry segments |
| Receiver | Can be an entity that receives a Request message with a RESTful operation, it can process it and send a corresponding Response message |

DETAILED DESCRIPTION OF ILLUSTRATIVE EMBODIMENTS

Abbreviations

AE Application Entity
App Application

Use Case: Industrial TaskManager

Figure 1:
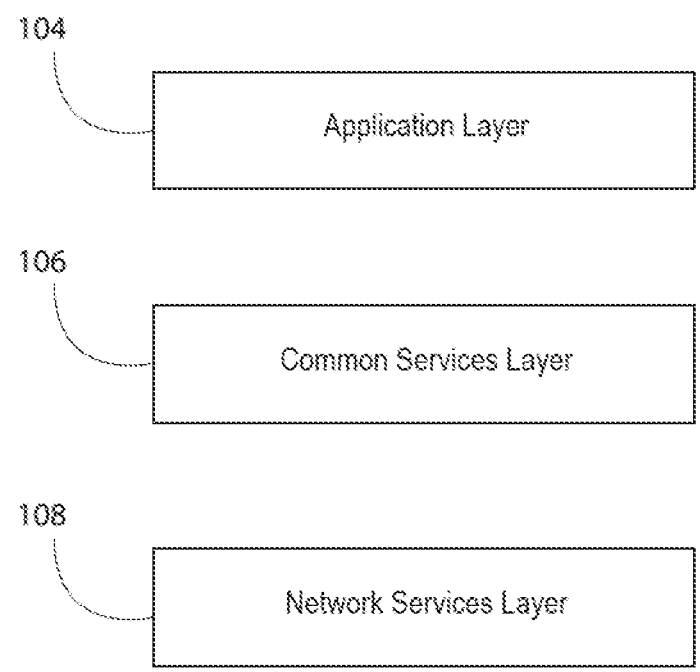
FIG. 1 is a diagram of an oneM2M layered model.
Figure 2:
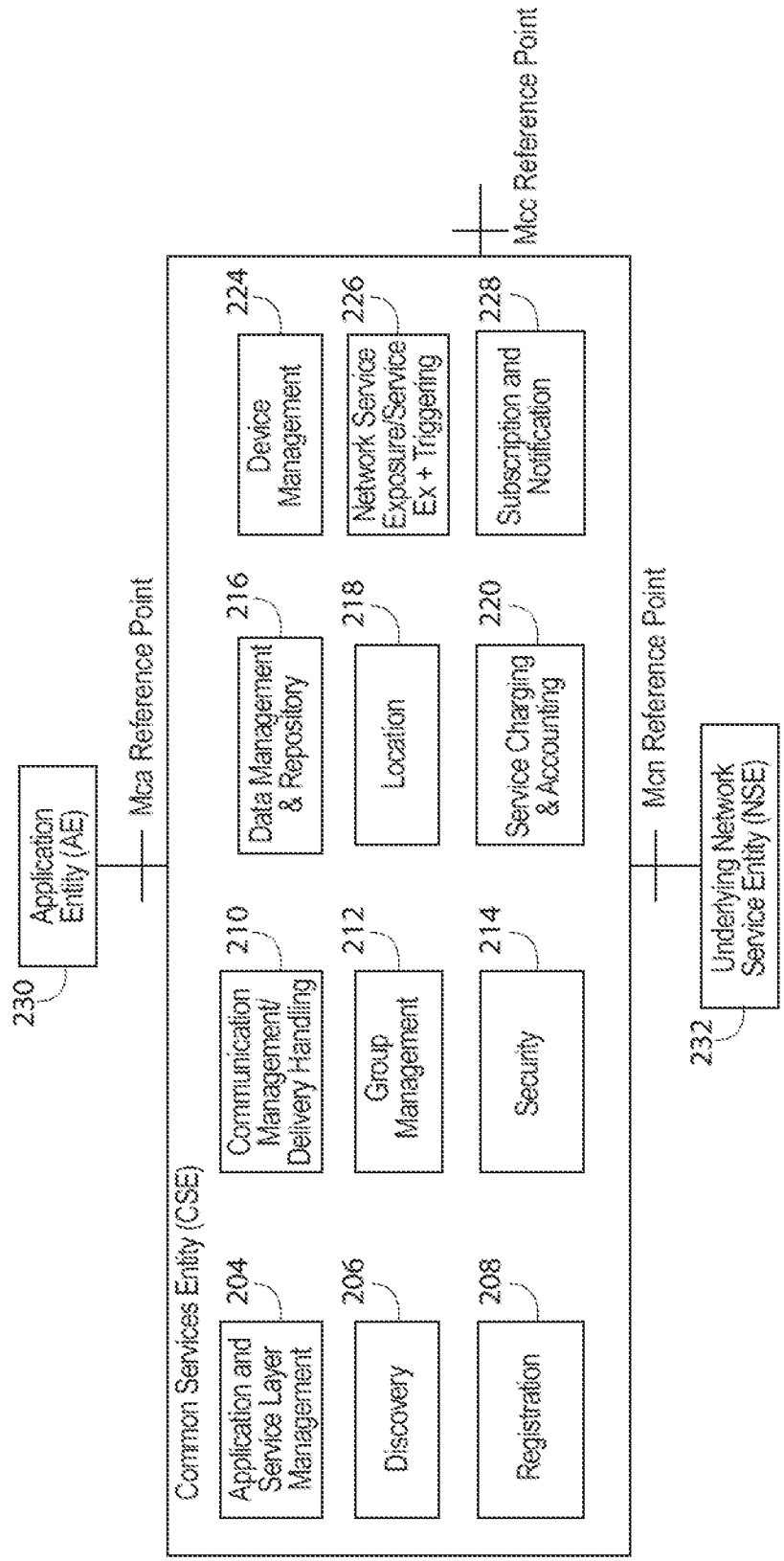
FIG. 2 is a diagram of Common Services Functions.
Figure 3A:
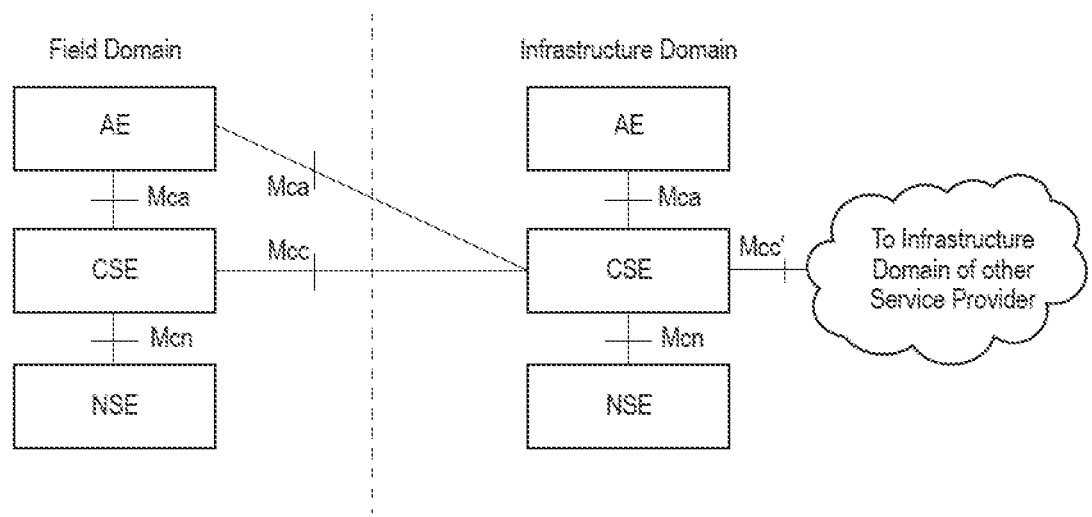
FIG. 3A is a diagram of a Resource Oriented Architecture (ROA) oneM2M Functional Architecture.
Figure 3B:
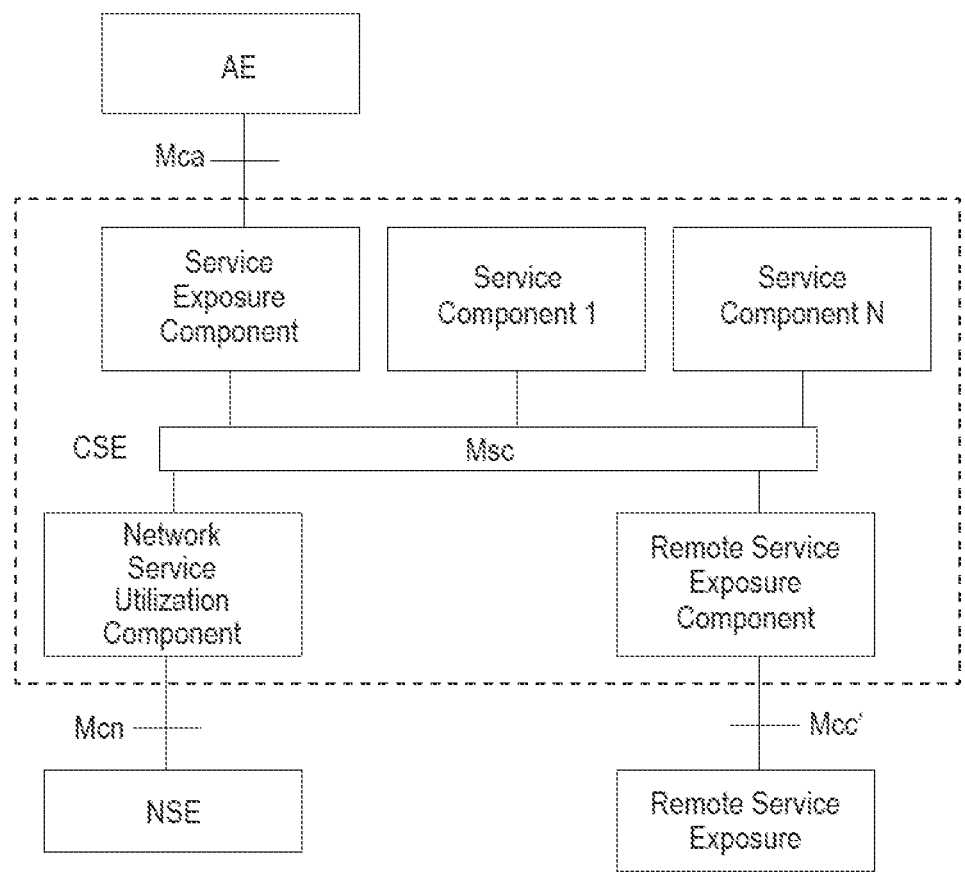
FIG. 3B is a diagram of a Service Oriented Architecture (SOA) oneM2M Functional Architecture.
Figure 4:
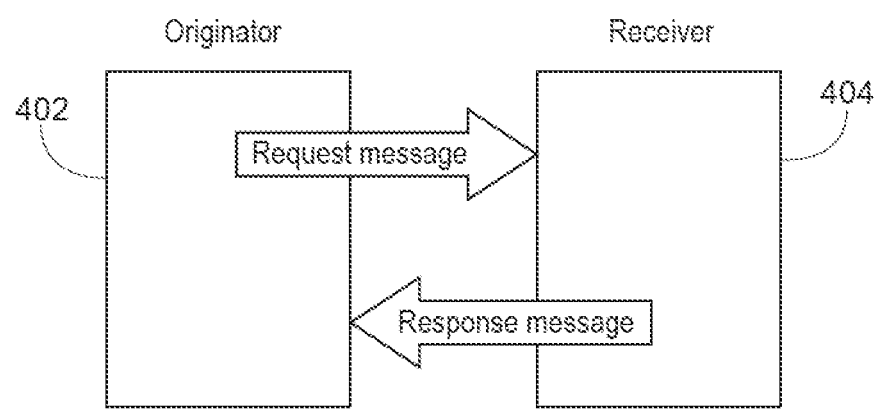
FIG. 4 is a diagram of general communication flow in oneM2M.
Figure 5:
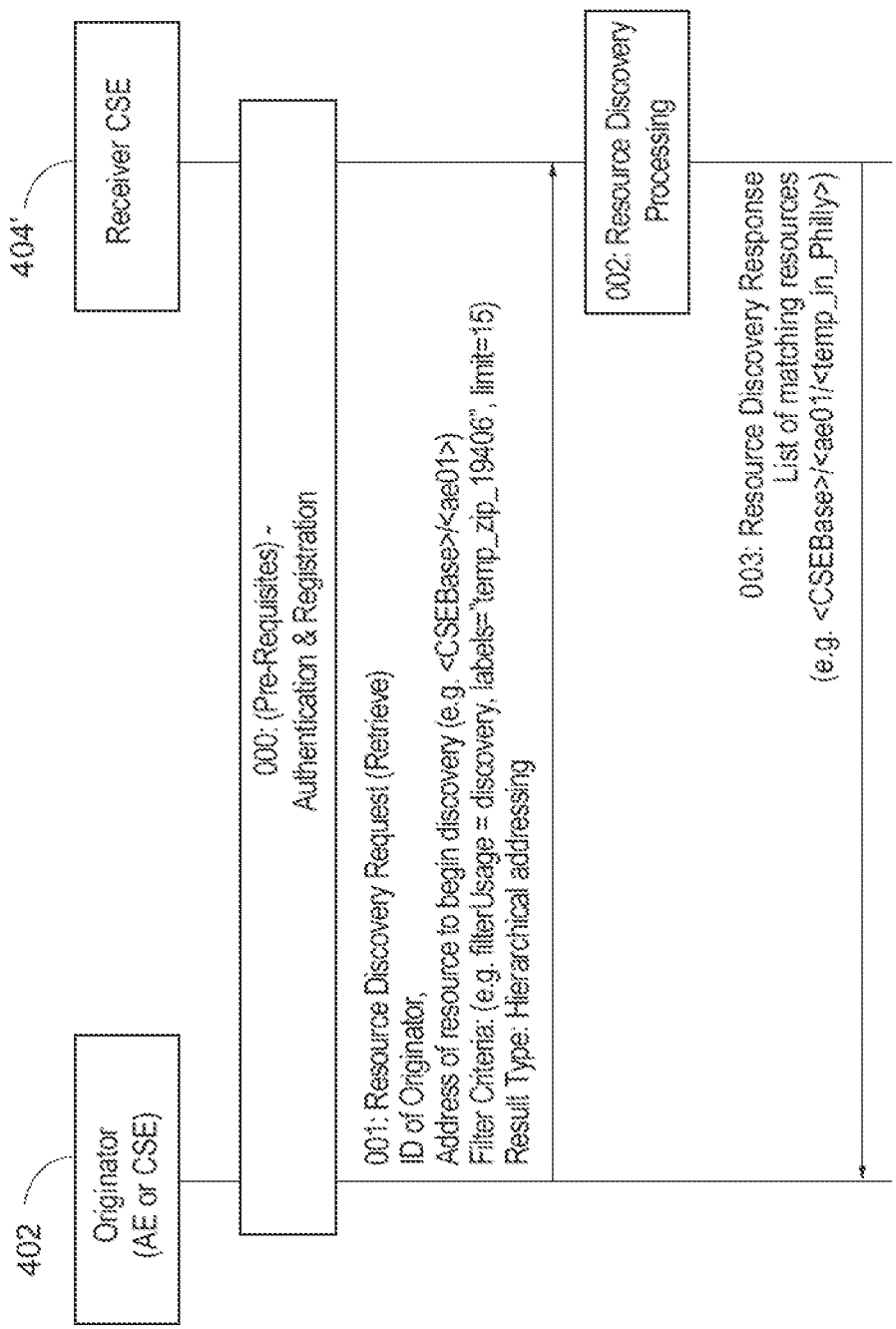
FIG. 5 is a diagram of an oneM2M general resource discovery procedure.
Figure 6:
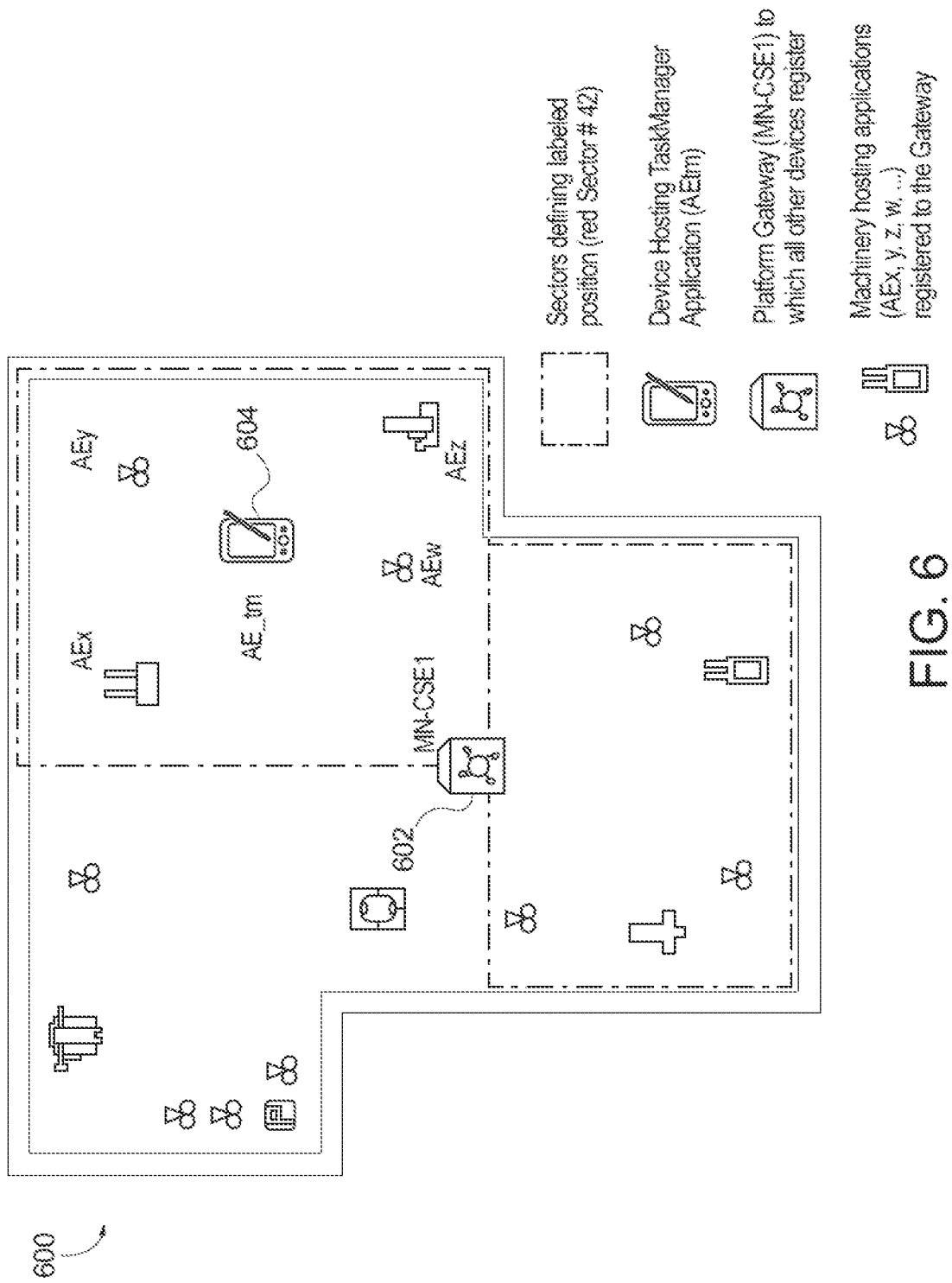
FIG. 6 is a diagram of a TaskManager use case.

FIG. 6 depicts an industrial floor 600 with a variety of fixed machinery, mobile vehicles and robots as well as movable tools (generically termed "equipment"). There are a variety of sensors on the machines, vehicles, tools, robots and on the floor. People are also moving through the area and accomplishing individual tasks.

The sprawling floor has multiple gateways which communicate with the equipment providing services of various levels of complexity. For an example using an oneM2M-based platform, the gateways map to MN-CSEs and the equipment to AEs (e.g. AE1, 2 . . . or AEx, y, z . . . ) residing on either ASNs or ADNs registered to the nearest gateway. As such, an individual MN might host the sensor measurements provided by a variety of ambient sensors, as well as the resources necessary to control static and complex machines such as automated milling machines or lathes. Nomadic robots also register to the nearest gateway after transitions. The M2M platform providing services to the factory and integrating the MN-CSEs also provides location and semantic services. For example, it maintains location, operational status, maintenance status, etc. information for each piece of equipment registered via corresponding resources. In this case we assume the location and maintenance status are maintained via labels applied to the relevant resources.

A mechanic has been performing maintenance in one of the floor sectors and wants to find the units in the area when they stop, in order to perform an operation. For example he needs to check the physical status of several components/items (e.g. wheels, bearings, accumulated debris), which might be different depending on the equipment type. He has access to a mobile device with rich capabilities, which connects to the Wi-Fi network of the industrial complex and registers itself to the nearest gateway (MN-CSE1) 602.

For this job, the mechanic uses a "TaskManager" application (AE_tm) 604 which searches for any equipment ready for his operation and subscribes to the operational status information of the relevant devices. The subscriptions are targeted at equipment in the vicinity of the mechanic whose maintenance is not current. It is assumed that location and maintenance status are discoverable via labels (i.e. specialized resource attributes) applied to the relevant resources. The TaskManager accomplishes this functionality by issuing a discovery request message to the gateway (MN-CSE1 602) with the relevant search criteria (e.g. label=Sector #42 && label=maintenanceNotCurrent) and based on the returned results, application creates a subscription notification to the operational status (e.g. Off, Idle, Running). The gateway, which handles several sectors, returns a list of all registered equipment in the mechanic's vicinity and creates subscription to the operational status container.

As soon as the TaskManager AE_tm 604 is notified about a piece of equipment that is idle or off, it retrieves additional details such as the equipment type (static vs. not), expected idle time period, etc. When the mechanic updates his own status as available, the TaskManager directs him to the next equipment to be serviced and could provide a task checklist customized for the particular piece of equipment.

Owing to the dynamic nature of the operational status (machine might become available and then busy again before being serviced), it is more efficient to subscribe to the operational status, rather than regularly performing discovery based on the value of the operational status. This will ensure that discovery requests will be minimized.

Also, there may be no available tasks at certain times if all equipment in vicinity has been serviced, if none is idle or predicted to be idle for a long time or if those available have changed positions. In any of these situations the TaskManager may initiate a new discovery (either on its own or at the mechanic's prompting) with different parameters such as a new location.

Figure 7:
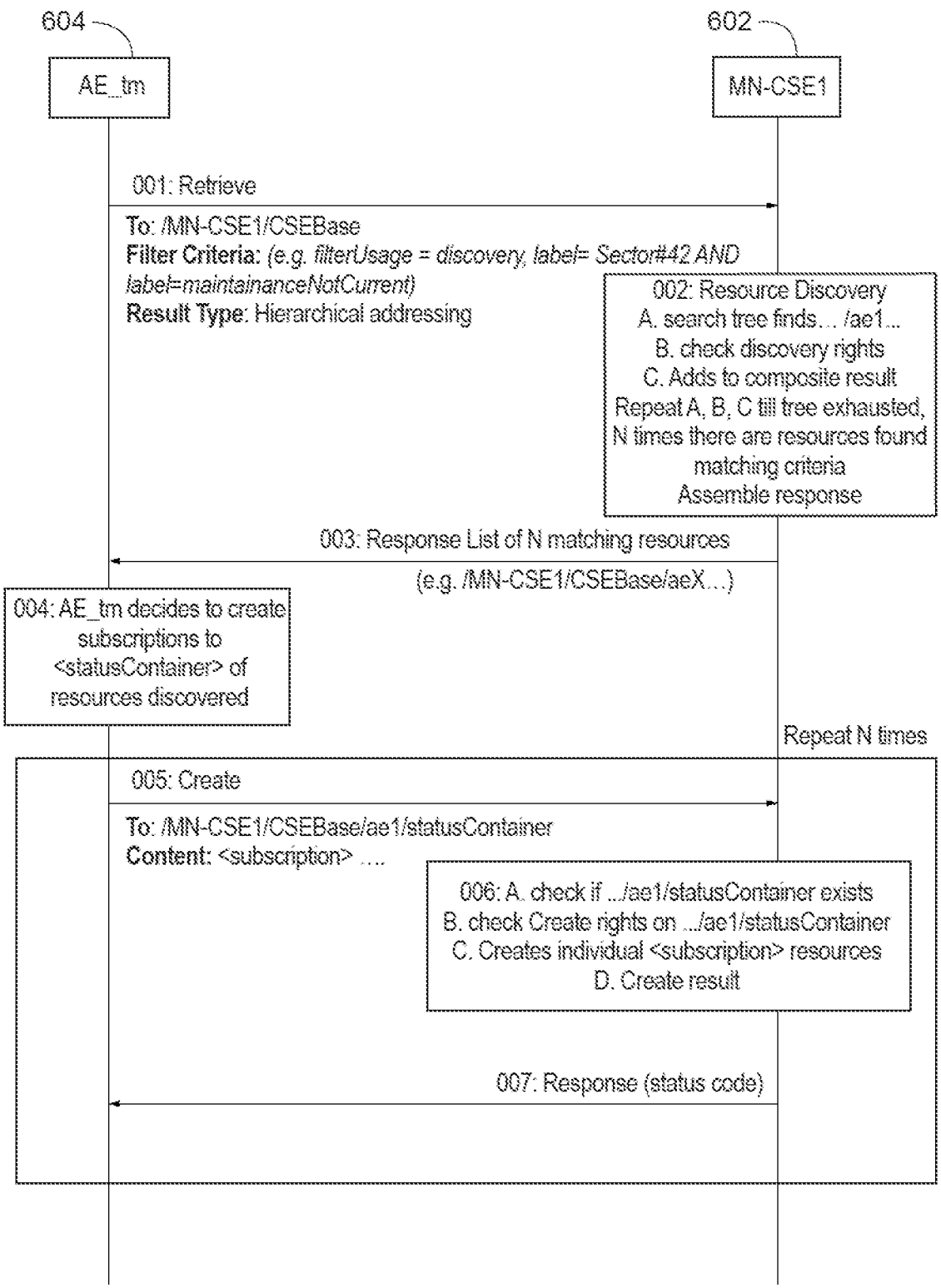
FIG. 7 is a diagram of a use case flow with existing oneM2M operations.

To provide for this scenario in a current oneM2M implementation, the TaskManager AE_tm 604 application could perform a Discovery Request to find equipment in the area, followed by a subscription creation based on the discovery results. If the discovery returns a large number of pieces of equipment (e.g. N), it is followed by a large number of CREATE requests, as depicted in FIG. 7

Figure 8A:
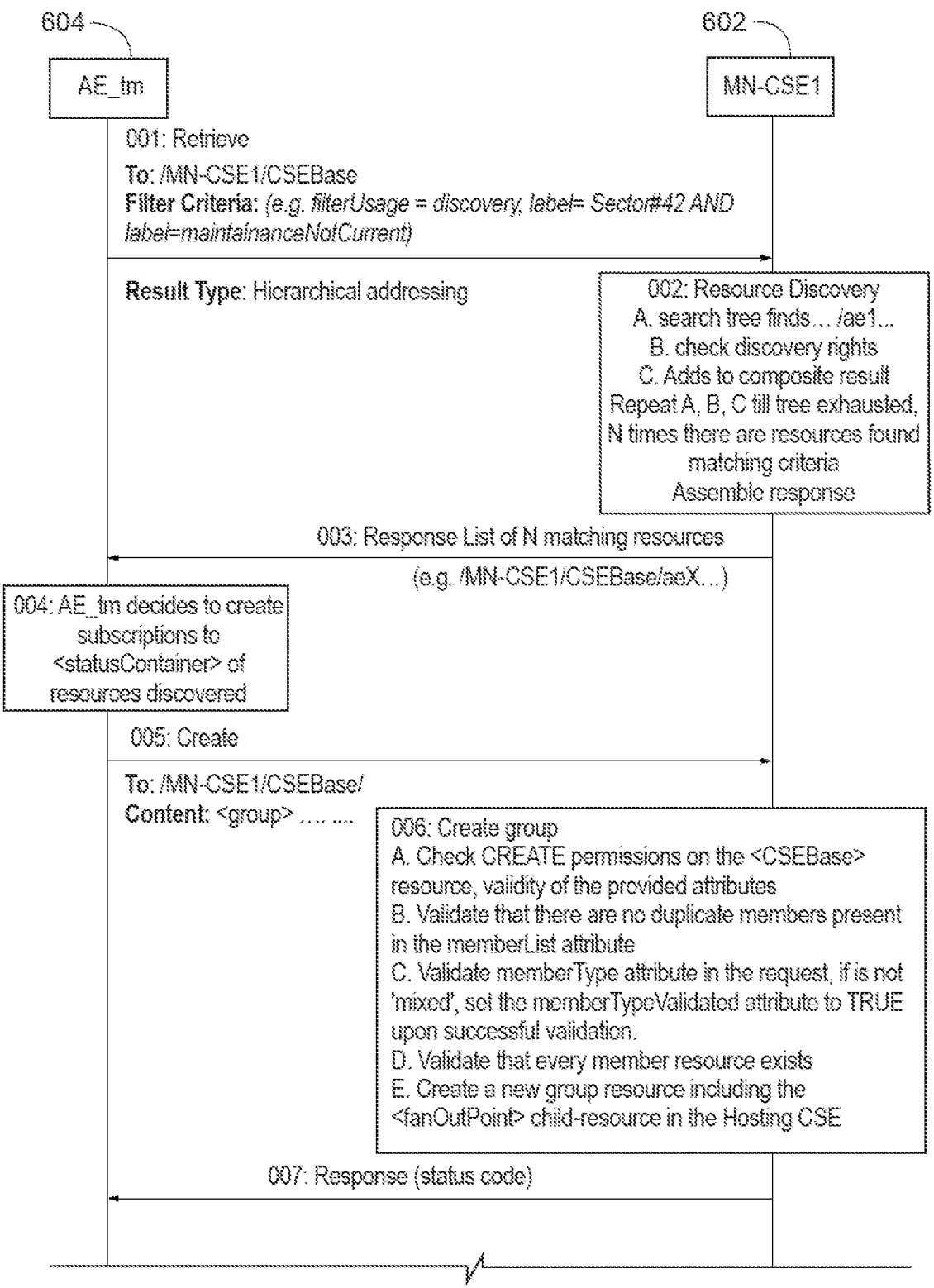
FIG. 8A-8B is a diagram of a use case flow with existing oneM2M operations, using group functionality.
Figure 8B:
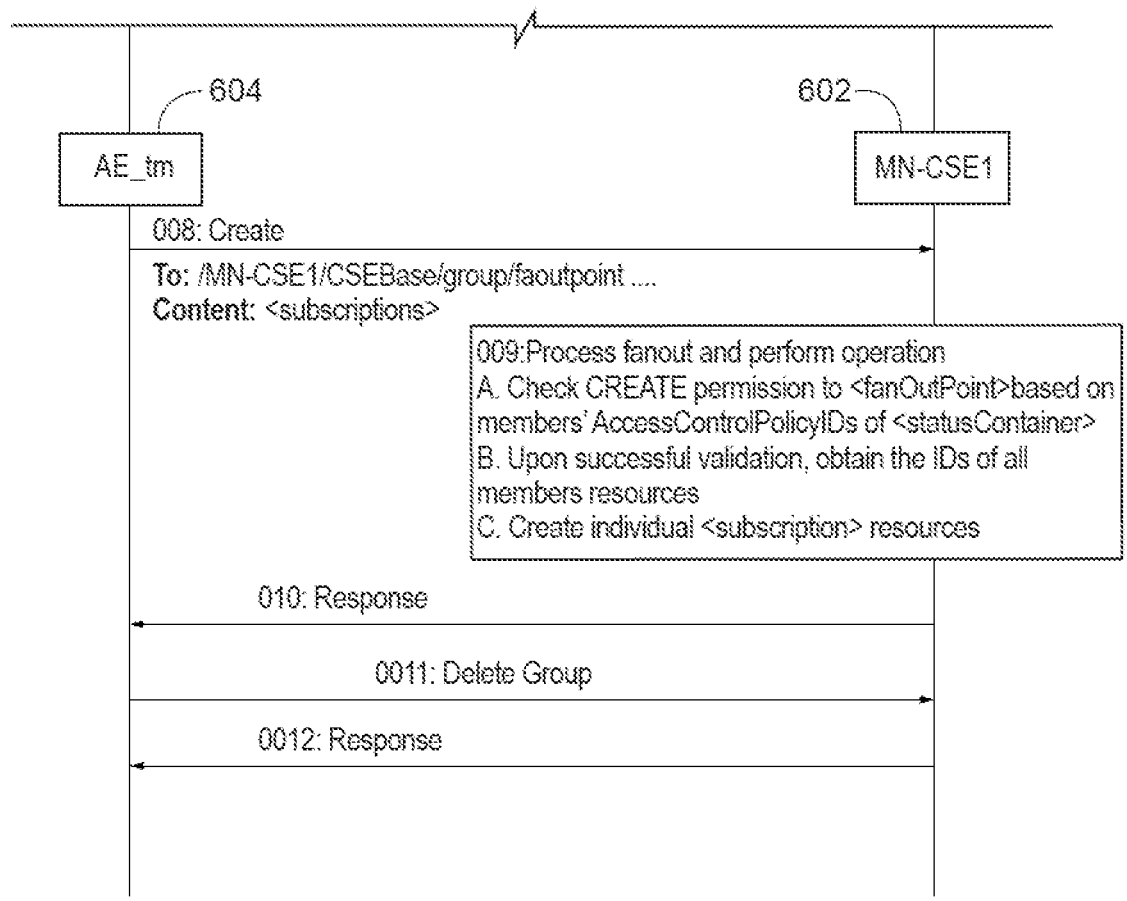

If AE_tm 604 uses the oneM2M group creating mechanism, the group will be created literally for a very limited amount of time and for very few operations, after which it should be deleted, as depicted in FIG. 8A-B. This is a naïve use of the group operation, for which the mechanisms currently provided have not been optimized.

These mechanisms are therefore not optimal because of the overhead in either the amount of messaging required and/or the number of short-lived groups (with very limited use) created. While this use case exemplifies the CREATE operation, the issue is valid for all CRUD operations.

Another problem would be posed if the labels used for criteria matching would have been applied by different management applications at various levels throughout the resources tree. For example if the sector label is applied to a <location> child container while the maintenance status label has been applied to the <AE> parent resource. Current mechanisms providing filter criteria to be matched against the same resource results in limitations in the usefulness of the results which may be obtained through any single discovery request.

Sometimes the procedure used by the TaskManager may discover machines already subscribed to, for example if the machine has been moved from a previously serviced sector before having the maintenance update performed. In this case the TaskManager may want to mandate that the CREATE operation results in an update of the existing resource, rather than in the creation of a new resource with a changed name.

At the same time, other applications using the same gateway may require different processing of a similar case. For example when attempting to create a new resource and there is an existing child resource with the same name, other application may need the existent resource to be deleted and a new one with the same name and the new content to be created. However, in general processing of such conditions or exception cases relies on default processing at the Receiver 404. This means that currently no differentiation may be achieved in exception/condition handling at the Receiver 404

Currently RESTful procedures target the execution of CRUD (Create, Retrieve, Update, and Delete) operations and may also allow for checking that certain criteria or conditions occur.

There are many use cases involving CRUD operations which target the result of a discovery request and as such require separate sub-procedures and steps: some for performing the discovery and others in execution of the CRUD operations on the resources provided by the discovery step. As a consequence of a discovery resulting in a set (more than one) of resources, several separate request/response procedures are needed for executing the operation on each resource in the set, or group creation is needed.

The special procedures optimized for group operations do provide improved messaging efficiency which is very useful for cases in which the same set of resources requires further handling as a group. There are however special cases in which creating persistent groups of resources based on discovery results is not needed. These are cases when the result set validity is limited in time (very soon another discovery operation with the same parameters will yield different results) or when there is a limited number of operations to be performed on the result set (possibly one).

In many cases, once an initial resource tree structure has been discovered, the discovery operation is used for search and filtering in preparation of future operations. The existing procedures requiring sequential messaging and processing result in inefficiencies because they do not take advantage of resource tree information already available at the Originator 402 before it performs some searches. Similarly, the Receiver 404 obtains information separately for execution of individual steps (e.g. discovery, individual CRUD operations), and so is unable to optimize them together. As such, the current mechanisms described above result in overhead of either the amount of messaging required and/or the number of limited use, short-lived groups created. However, having the ability to request resource discovery at the same time with desired CRUD operations may introduce significant optimizations.

In addition, current mechanisms providing multiple filter criteria to be matched against the same resource rather than against multiple related resources, result in limitations in the usefulness of the results which may be obtained through any single discovery request.

Finally current processing of RESTful operation requests do not allow for differentiation in exception/condition handling at the Receiver 404, which constrains their use by applications with differentiated needs.

Nomenclature

As discussed above, in many cases a resource discovery operation is followed by a batch of new CRUD requests targeting the resource discovering outcome. In a new solution, the batch of CRUD operations can be coupled with the resource discovery operation and directly performed on the discovered resources, without initiating new/separate CRUD requests.

The enhancements incorporate elements of filtering and discovery with the traditional CRUD operations. The naming convention provided in this section seeks to clarify the terms used in the following descriptions.

Filter Base: The resource used as starting point for a discovery operation, whose descendants are subject to filter criteria.

Matched Resource: A resource for which the filter criteria is true.

Filtering Result: The result of a filtering or discovery operation may be composed of Matched Resources or resources related to the Matched Resources, depending on operation parameters. It may consist of one or more resources.

Target Resource Set: One or more resources which are the target of a CRUD operation. The Target Resource Set may be the same as the Filtering Result of the discovery operation, or be composed of resources related to the Filtering Result, depending on operation parameters.

Operation Result: Indicates the result of the CRUD on the Target Resource Set. For the enhanced operations described here it may be the result of the operation on multiple resources, if the Target Resource Set consists of multiple resources. The format of the operation result included in the result message may vary based on options provided in the request: e.g. resources, resources and child resources etc.

Overview

The upcoming sections describe enhancements to RESTful operations. Overall enhancements to Request messages are described, including:

New request message parameters and new functionality at the Originator 402 and Receiver 404 which differentiates the resources for which criteria matching is applied from the resources included in the discovery/filtering results. Enhanced functionality at the Originator 402 and Receiver 404 linking RESTful and discovery operations.

Enhancements to Filter Criteria (e.g. to discover resources that have a parent or a child that match certain filter criteria). It also introduces enhanced Filter Directives (e.g. to request creation of a group for the resources matching the filter criteria, or to specify the relation between Target Resources and Matched Resources)

Enhanced Exception Handling: for instance to change the behavior when certain conditions or exception situations occur.

The procedural effects of the enhancements summarized above and provides further details for the parameter usage at both Originator 402 and Receiver 404.

oneM2M embodiments are described along with further details on processing, by being able to use concrete, standardized examples of resources to the operations described Request Message Enhancements New Request Message Parameters This section illustrates the functional enhancements to the Request messages by introducing new operation parameters.

In general the flow that governs the information exchange procedures is based on the use of Request and Response messages. Requests are sent by an Originator 402 to a Receiver 404 and contain parameters which may be mandatory or optional. Certain parameters may be mandatory or optional depending upon the requested operation.

We assume the existence of the following Request message parameters:

Operation: Specifies the exact RESTful operation to be executed, e.g. CREATE, etc.

To: Address of the target resource where the operation is to be executed

FilterCriteria: Criteria for condition matching

Content: Resource content to be used in the operation, e.g. content of a resource to be created. Its presence is assumed not to be mandatory for all operations.

We also assume the existence of the following Response message parameters:

Response Code: Parameter indicating the success or failure of the operation. It may include status information providing further execution details Content: Resource content based on the operation result, e.g. content of a resource which has been created. Its presence is assumed not to be mandatory for all operations.

The new operation parameters are described for a RESTful request operation.

(NEW) FilterBase: Address of the root where the discovery begins on Hosting CSE, Choices include, but are not limited to:

FilterCSEBase: Receiver 404 starts the discovery at the CSEBase;

(FilterAddress): Receiver 404 starts the discovery at the specified address included in this field.

NULL or DEFAULT (or not present): No enhanced functionality is requested and regular processing is performed.

If FilterBase is present and different than NULL or DEFAULT, it can indicate that the operation is treated as an enhanced operation.

Sometimes requests are routed through a transit CSE to a final destination which is the Receiver 404. For regular operations the transit CSE routs messages to the Receiver 404 pointed by the To address. For enhanced operations, indicated by the presence of the FilterBase address, the transit CSE will route messages to the FilterBase address. All other processing is the same as in the direct communication cases presented in this paper.

The FilterCSEBase choice is resolved at the Receiver 404 into the corresponding URI. Implementation may use only the second choice, where the actual address is provided, without losing any of the functionality described above (NEW) CompositeResult: Indicates the expected components of the Content field in the Result message to the Originator 402.

Choices based on the described functionality include, but are not limited to:

FilteringResult: Receiver 404 will return the Filtering Result of the discovery operation, based on the parameters specified by the Originator 402 (see Filter Criteria below)

OperationResult: Receiver 404 will return the result of the RESTful operation on the Target Resource Set FilteringAndOperationResult: Receiver 404 will return both the filtering Result and the result of the RESTful operation on the Target Resource Set Nothing or DEFAULT (or not present): Receiver 404 returns no result (NEW) ExceptionHandling: Indicates handling of certain conditions or exceptions.

Choices include, but are not limited to:

UpdateExistingName. Used when the Receiver 404 creates a resource. If the Originator 402 requests "UpdateExistingName", the Receiver 404 is required to use the name supplied by the Originator 402. As a result, certain operation actions will need to be modified (for instance CREATE)

NULL or DEFAULT (or not present) Receiver 404 uses default exception handling The functionality of an existing RESTful request parameter can be enhanced as follows (ENHANCED) To: Address, currently required to resolve to a unique URI addressing the target resource where the CRUD operation is to be executed.

In this proposal, we add the option of using the To parameter to provide a relative relationship between the resources discovered (Filtering Results) and the resources on which the RESTful operation is to be performed (Target Resources).

This option is valid for enhanced operations only and for this purpose the To field must be provided as a relative path, which is to be concatenated with the Filtering Result to obtain the Target Resource Set. If the address provided in the To field is NOT relative, the Target Resource Set is the same as the Filtering Result.

Other possible enhancements to the Filter Criteria are detailed in the Embodiments section.

Enhancements for Filtering Criteria and Directives

We assume the possibility of providing Filter Criteria in exiting RESTful operations, to be used for filtering or discovery purposes. In order to enrich the existing filtering and discovery processes, we propose the introduction of several new parameters to indicate filtering criteria which are to be used to match related resources, e.g. to match attributes of a child or parent resources.

Here, the following new search parameters are described:

(NEW) childResourceType: The Matched Resource has to have a child resource of this type (NEW) childResourceName: The Matched Resource has to have a child resource with this name (NEW) childLabels: The Matched Resource has to have a child resource with a label matching the given value (NEW) childAttribute: The Matched Resource has to have a child resource with an attribute matching the given value (NEW) parentResourceType: The Matched Resource has to have a resource of this type as its parent (NEW) parentResourceName: The Matched Resource has to have a resource of this name as its parent (NEW) parentLabels: The Matched Resource has to have a resource with a label matching the given value as its parent (NEW) parentAttribute: The Matched Resource has to have a resource with an attribute matching the given value as its parent Parameters indicating how the Filter Criteria should be used, therefore acting as Filtering Directives can also be used.

(NEW) returnRelativeRelationship informs the Receiver 404 how the result of the discovery (Filtering Result) are related with the resources for which the discovery criteria applies (Matched Resource Set), with the following relationship options:

Self: the discovered resources are the same as the matched resources;

Parent: the discovered resources are the parents of the matched resources. The Receiver 404 may implement logic to remove duplicate parent resources from the Filtering Result.

Semantics: the discovered resources are sub-resources containing semantic information for each matched resources, e.g. in oneM2M the <semanticDescriptor> sub-resource will be returned in the Filtering Result Subscription: the discovered resources are sub-resources containing subscription information for each matched resources, e.g. in oneM2M the <subscription> sub-resource will be returned in the Filtering Result Latest: the discovered resources are the latest instances of each matched resource. This applies when the criteria given targets resources which retain multiple instantiations, e.g. in oneM2M <container> resources Oldest: the discovered resources are the oldest instances of each matched resource. This option is valid when the criteria applies to resources which retain multiple instantiations, e.g. in oneM2M <container> resources For all returnRelativeRelationship values, if a resource is matched but no resource with the given relative relationship is found, the result is treated as if no match was found.

An example based on oneM2M: The <AE1> resource is matched based on the given criteria and returnRelativeRelationship==Subscription, but <AE1> has no <subscription> sub-resources. The case is treated as if <AE1> did not match the given the criteria in the first place, so it is removed from the Matched Resource Set.

(NEW) formGroup: Form a group based on the results of the filtering process. Choices include, but not limited to: MatchedResources, FilteredResources, OperationResult.

(NEW) groupID: If formGroup is present, a groupID might be indicated by the Originator 402. If formGroup is not present this parameter is ignored.

Exception Handling Indications

Each operation has default exception handling, however, the Originator 402 may specify enhanced exceptional or conditional handling. For instance consider an oneM2M case where a specific <AE> resource (say AE1) already has a child <subscriptionX> resource, i.e. a child resource of type <subscription> named "subscriptionX". In such a case, when an Originator 402 tries to CREATE a new <subscription> resource named "subscriptionX", the current behavior of the Receiver 404 may be to create another child resource, e.g. <subscriptionAlt> by changing the name provided by the Originator 402, and to return the new name with the operation result.

We propose that the Originator 402 may request the subscription creation with ExceptionHandling=UpdateExistingName. In such a case, the Receiver 404 is forced to interpret the operation as an UPDATE to the existing <subscriptionX> child resource, and not to create another one. The Receiver 404 will first verify create rights of the Originator 402 at the addressed resource <AE1> AND update rights of the Originator 402 at the resource to be updated <AE1/subscriptionX>. If these rights allow the operation, it will execute an UPDATE of <AE1/subscriptionX> with the provided content.

The possible choices for ExceptionHandling may be expanded based on implementation needs. For example, another value "IgnoreExistingName" may be used to request the Receiver 404 to ignore the existence of a child resource with the given name. Therefore, the Receiver 404 shall delete the old resource and replace it with the content of the new Create operation.

Alternatives

The enhancements presented above may have alternative implementations.

Modifications of existing parameters: to reflect the new functionality, instead of introducing the new parameter FilterBase, the use of the To parameter may be modified further. A simple bit flag (e.g. Eflag) may be used to indicate an enhanced operation and the To field reused to provide the FilterBase address for this case. Since no relative path could be provided in this case, the Target Resource Set may be considered by default to be the same as the Filtered Result for all enhanced operations using such an implementation. Alternatively, a filtering directive similar to returnRelativeRelationship may be used. For example a targetRelativeRelationship filter directive may be introduced with similar choices of values (e.g. Self, Parent, Semantics, etc.)

New Operation types: to reflect the new functionality, new RESTful operation types may be created, e.g. DiscCreate (Discovery & Create), DiscUpdate (Discovery & Update), DiscDelete (Discovery & Delete). Similarly, assuming that regular Discovery is implemented using a Retrieve operation, a separate EnhDisc (Enhanced Discovery) operation might be created to reflect an ENHANCED discovery operation, separate from Retrieve or Retrieve with regular discovery/filtering functionality.

The new operation types can be implemented as additional choices to the C, R, U, D values for the Operation parameter of the Request message, e.g. DiscC, DiscU, DiscD, and EnhDisc may be added to the list of valid operation values. Assuming the above new operation types, the FilterBase parameter may no longer be needed as indicator for the enhanced functionality. As such the FilterBase and To parameters may be collapsed into one parameter (e.g. To) whose significance is conditional based on the operation type, as described in the previous sections.

For the new operations new access control policies may be defined, or the Receiver functionality is specified to use the access rights of the individual operations, as detailed in the following sections.

Operation Procedures

Figure 9:
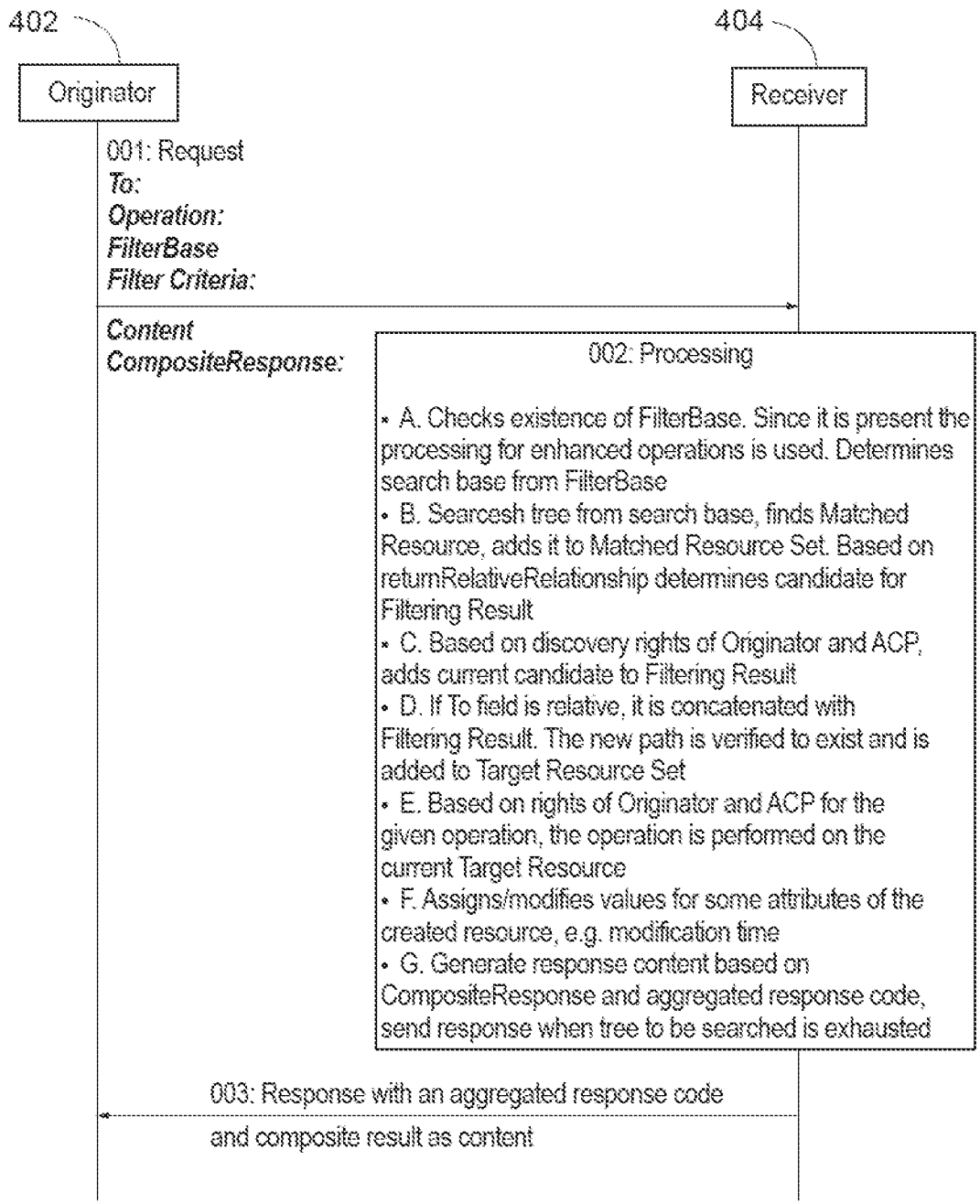
FIG. 9 is a diagram of a call flow for generic enhanced operations.
Figure 10:
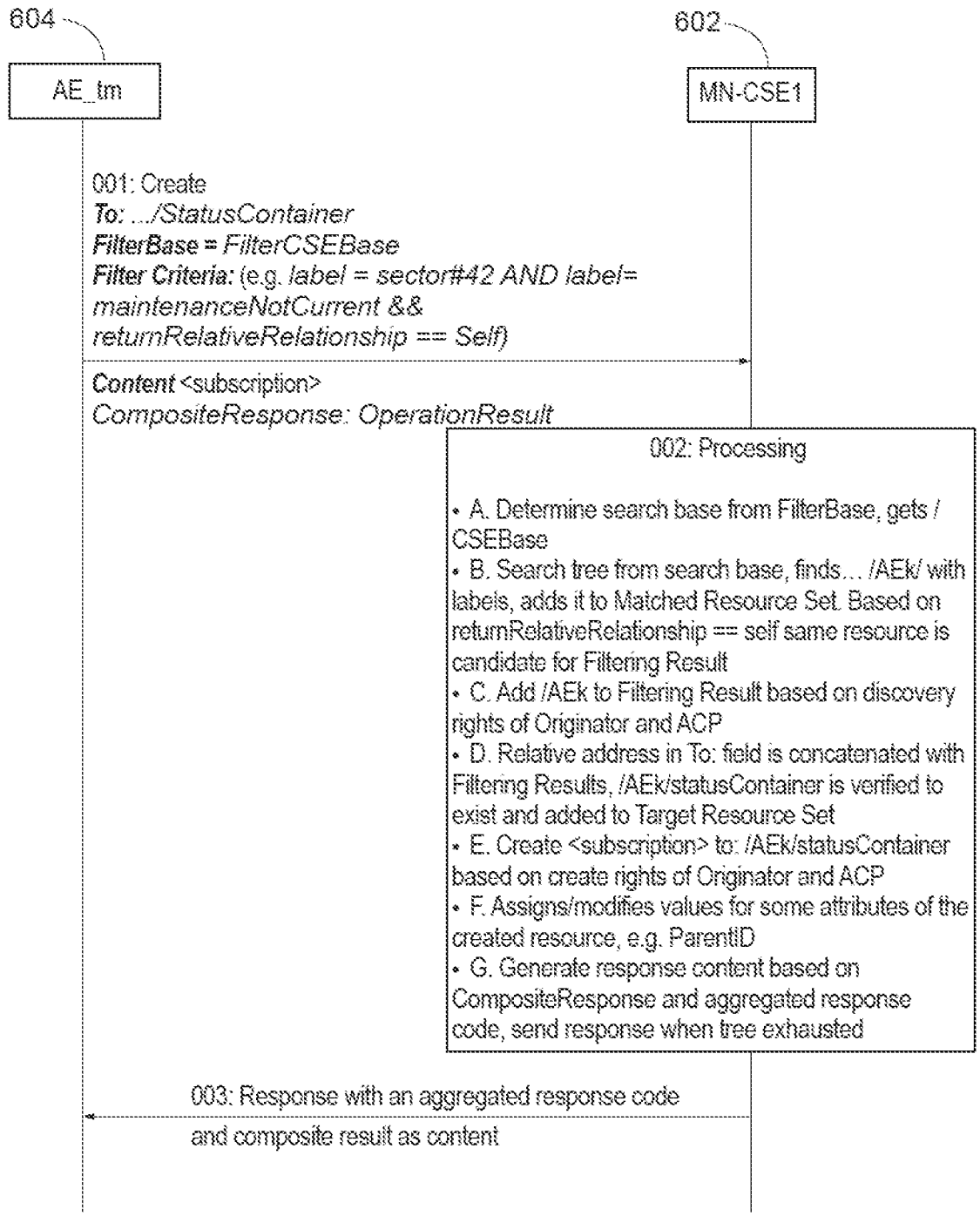
FIG. 10 is a diagram of an example call flow using enhanced CREATE operation for the TaskManager use case.

FIG. 9 illustrates a call flow for generic enhanced operations of one solution and details the Receiver 404 processing based on the new parameters. Figure illustrates an example call flow using enhanced CREATE operation for the TaskManager use case that will be described in detail. FIG. 10 illustrates one example of the generic call flow of FIG. 9.

The following subsections provide additional details using the oneM2M use case, where the TaskManager application subscribes to the StatusContainer of registered AEs only if they meet given sector and the maintenance state criteria.

In the example of FIG. 10, the Originator 402 issues a CREATE (C) request towards a Receiver 404, but the operation needs to be performed on resources to be discovered first by the Receiver 404 by evaluating given criteria.

Corresponding processing also applies to the other CRUD operations.

Similarly, the processing can be generalized to include other valid values and combinations of parameters. Further illustrations are also provided below.

In step 0 of FIG. 10, as a pre-requisite, the Originator 402 knows the relative address of the resource where the operation is to be performed. This may have been obtained by a prior discovery procedure or pre-configuration. For example the TaskManager AE_tm 604 performed discovery procedures at MN-CSE1 602 in prior searches and therefore understands its tree structure, particularly the resources created when the equipment AEs register with MN-CSE1 602, including those storing operation status information (in this case the child <statusContainer> of the <AE> resources). MN-CSE1 602 has the generic role of Receiver 404 of the Request messages, as well as Hosting CSE in procedures using more generalized terms.

In step 1 of FIG. 10, the Originator 402 issues a CREATE request including the following parameters:
(NEW) FilterBase=FilterCSEBase
Reflects the fact that the whole CSEBase tree will be searched for our use case.
FilterCriteria: (label=sector #42 AND label=maintenanceNotCurrent AND returnRelativeRelationship=self).
Reflects the resource matching criteria for our use case
Content: representation of the <subscription> sub resource to be created as child of all the target resources
(NEW) CompositeResult=OperationResult
For our use case it indicates what the expected components of the result are all the created resources
(NEW) ExceptionHandling=NULL
For our use case no special handling is necessary
(MODIFIED) To= . . . /StatusContainer For our use case enhanced operation processing is indicated by the existence of FilterBase, so the To field may be relative path. The Receiver 404 is instructed to concatenate . . . /StatusContainer with the addresses of the resources in the Filtering Result in order to determine the addresses of the resources in the Target resource Set.

The Receiver 404 processing is based on the type of the request received, as well as the contents of all parameters provided by the Originator 402 in the request, including the Filtering Criteria In step 2 of FIG. 10, the Receiver 404 receives the operation request and checks the parameters. Sub steps 2*a*-2*g* are described below.

In step 2*a* of FIG. 10, the Receiver 404 finds the search (i.e. discovery) base address based on FilterBase. In our use case it is /CSEBase. If FilterBase is not present then this is not an enhanced operation, so it proceeds from step D verifying the existence of the operation target.

In step 2*b* of FIG. 10, the Receiver 404 searches starting from the Filter Base /CSEBase for resources meeting the conditions (Filter Criteria). In each iteration it finds a resource /AEk, where k is an index of found AE resources matching the filter criteria, and it is incremented with each iteration i. For simplicity, these found resources are denoted as AEk (k incremented for kth matching resource) in the remainder of the document. Each AEk resource is a Matched Resource.

In step 2c of FIG. 10, based on returnRelativeRelationship=self each Matched Resource becomes candidate to be added to the Filtering Result. The Receiver 404 adds this candidate to the Filtering Result after checking the discovery rights of the Originator 402 at AEk. If the discovery operation is not allowed by the ACP a corresponding error code is generated.

Note that in the current RETRIEVE based discovery, the full tree representation of the search result is created for the operation result. In the processing described here, the Filtering Result may be instead only a list of resources meeting the conditions, without full tree representation.

In step 2d of FIG. 10, based on To: . . . /StatusContainer, the Receiver 404 verifies that each path /AEk/StatusContainer is valid, i.e. it corresponds to a child resource of the Filtering Result. If not it discards AEk from the filtering result and generates a corresponding error code.

In step 2e of FIG. 10, based on ACP and the originator 402 CREATE rights at /AEk/StatusContainer the Receiver 404 performs the CREATE operation on /AEk/StatusContainer of a <subscription> resource. If the create operation is not allowed a corresponding error code is generated.

In step 2f of FIG. 10, the Receiver 404 may assign values for some attributes of the created resource, as mandated by the operation requirements. For example the operation may require it to assign a resource ID for the newly created resource, or to assign values to certain attributes such as ParentID, creation time, etc.

In step 2g of FIG. 10, the Receiver 404 generates a composite response code based on the individual error codes in the previous steps. The Receiver 404 also assembles the content of the response based on CompositeResult. In this case CompositeResult=OperationResult, so the content field will contain the created <subscription> resources. When the tree search is exhausted it generates the response to be sent to the Originator 402.

If the formGroup indicator (and possibly groupID) is included in the request, the processing at the Receiver 404 includes the following: The Receiver 404 forms a resource group with the given groupID (or a self-selected ID) and in each search iteration would add new members. The members to be added depend on the value provided in formGroup (e.g. MatchedResources, ReturnedResources, OperationResult). As such, this processing may be incorporated in steps B, C or E, i.e. whenever a new valid resource is found for the Matched Resource Set or Filtering Result, or after an operation result is determined.

In step 3 of FIG. 10, the Originator 402 receives the response message and processes the mandatory and optional parameters contained, including the Composite Response Code. Based on the request parameters additional information might be included, such as a list of all the newly created resources, which may be used for further processing at the Originator 402.

Figure 14A:
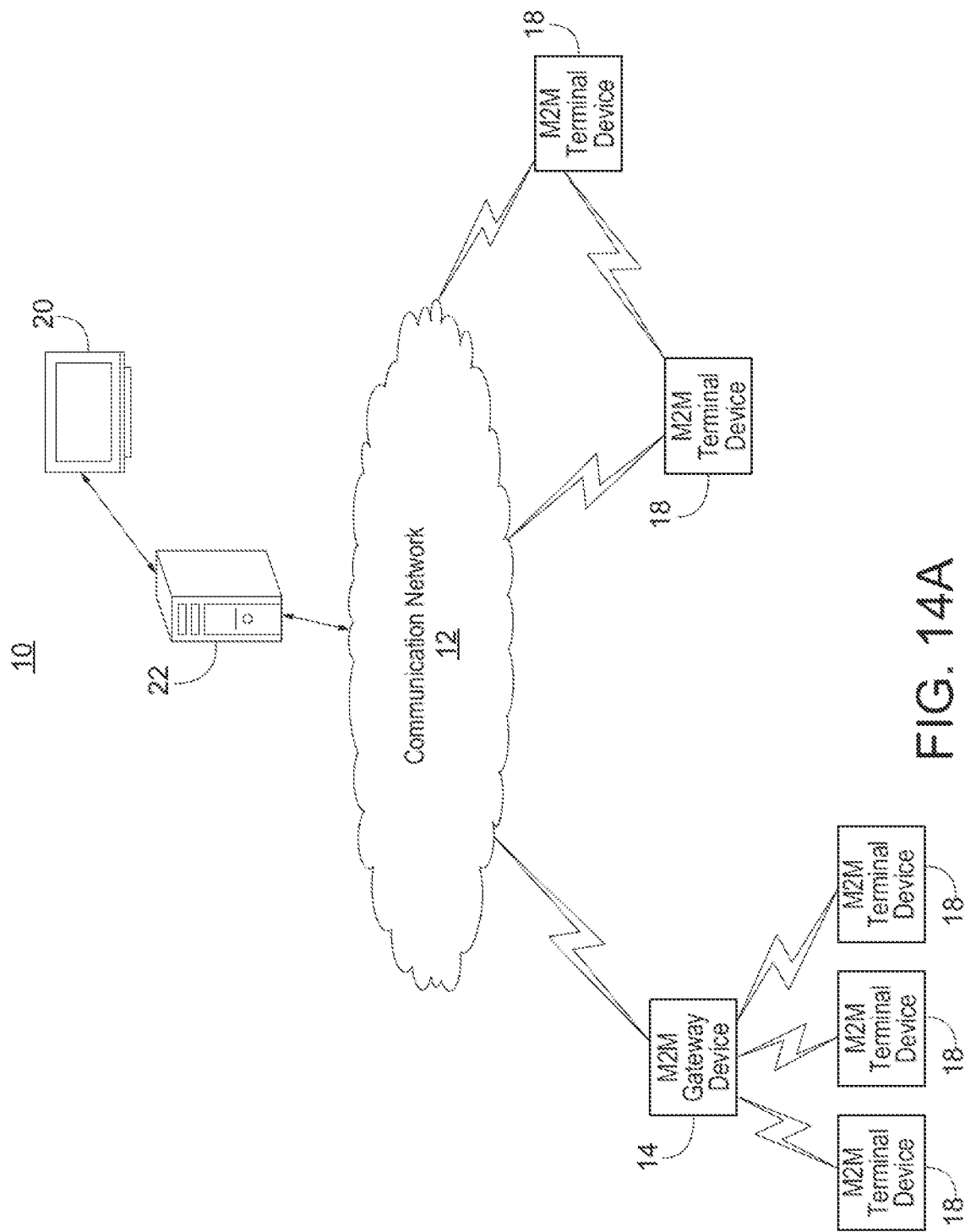
FIG. 14A is a diagram of a M2M/IoT/WoT communication system that includes a communication network.
Figure 14B:
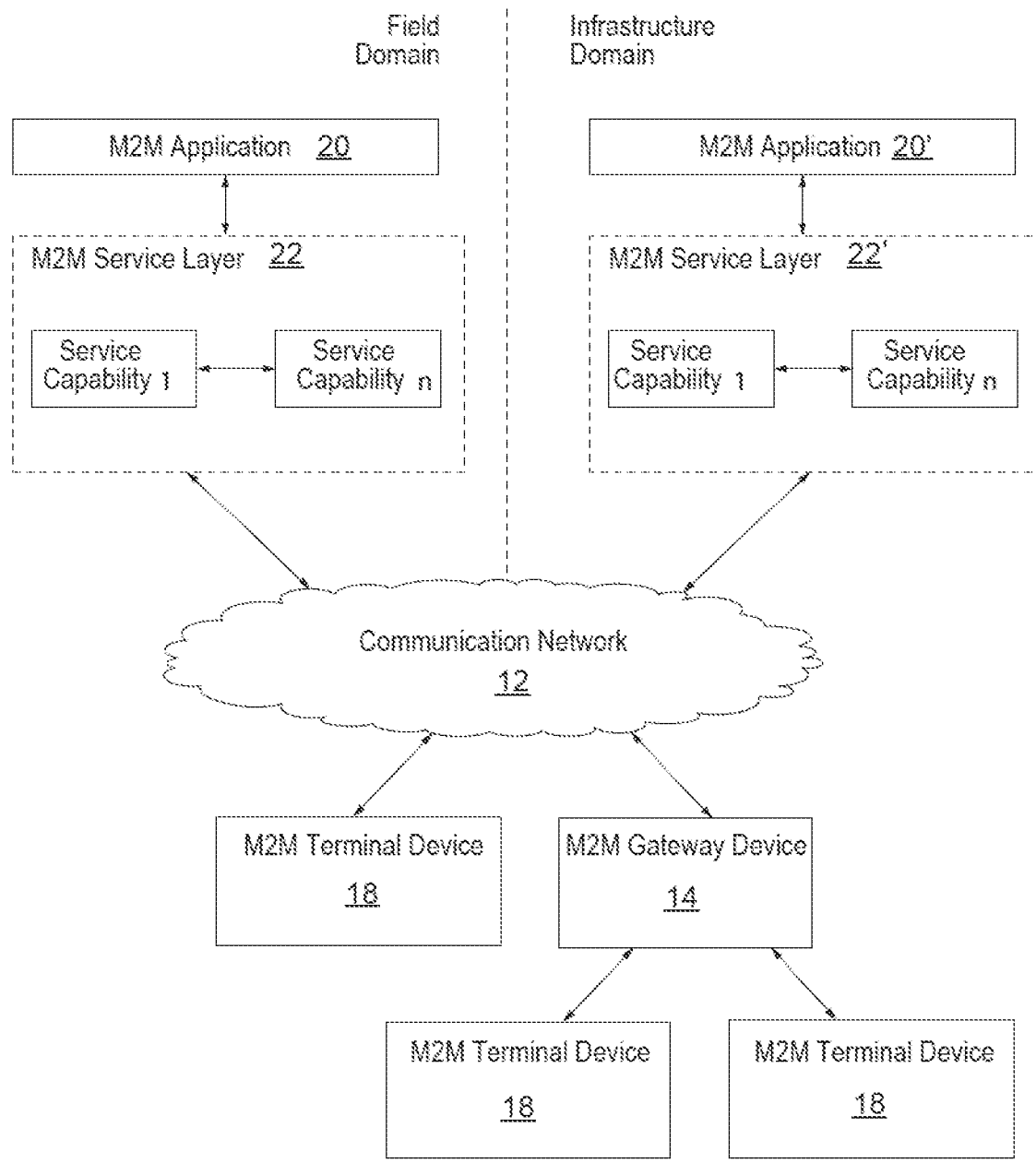
FIG. 14B is a diagram of an illustrated M2M service layer in the field domain that provides services for the M2M application, M2M gateway devices, and M2M terminal devices and the communication network.
Figure 14C:
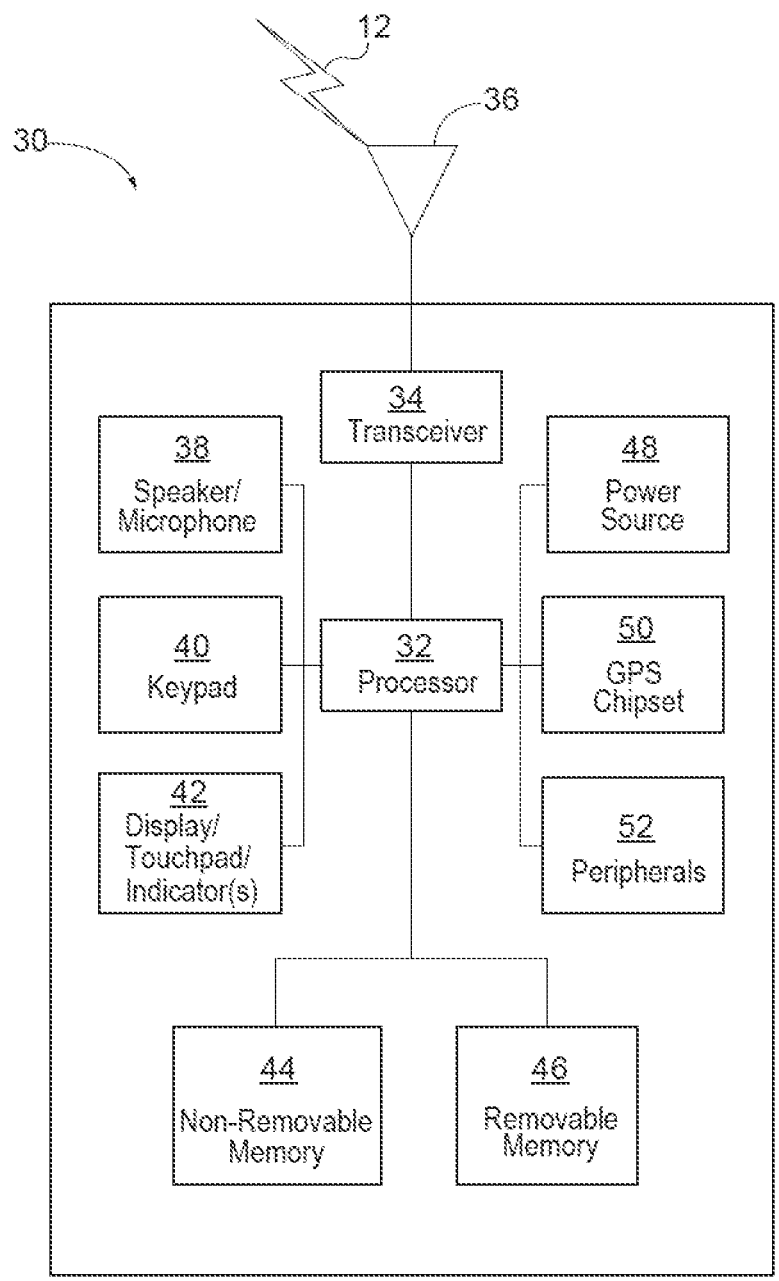
FIG. 14C is a diagram of an exemplary device that may be used to implement any of the network nodes described herein.
Figure 14D:
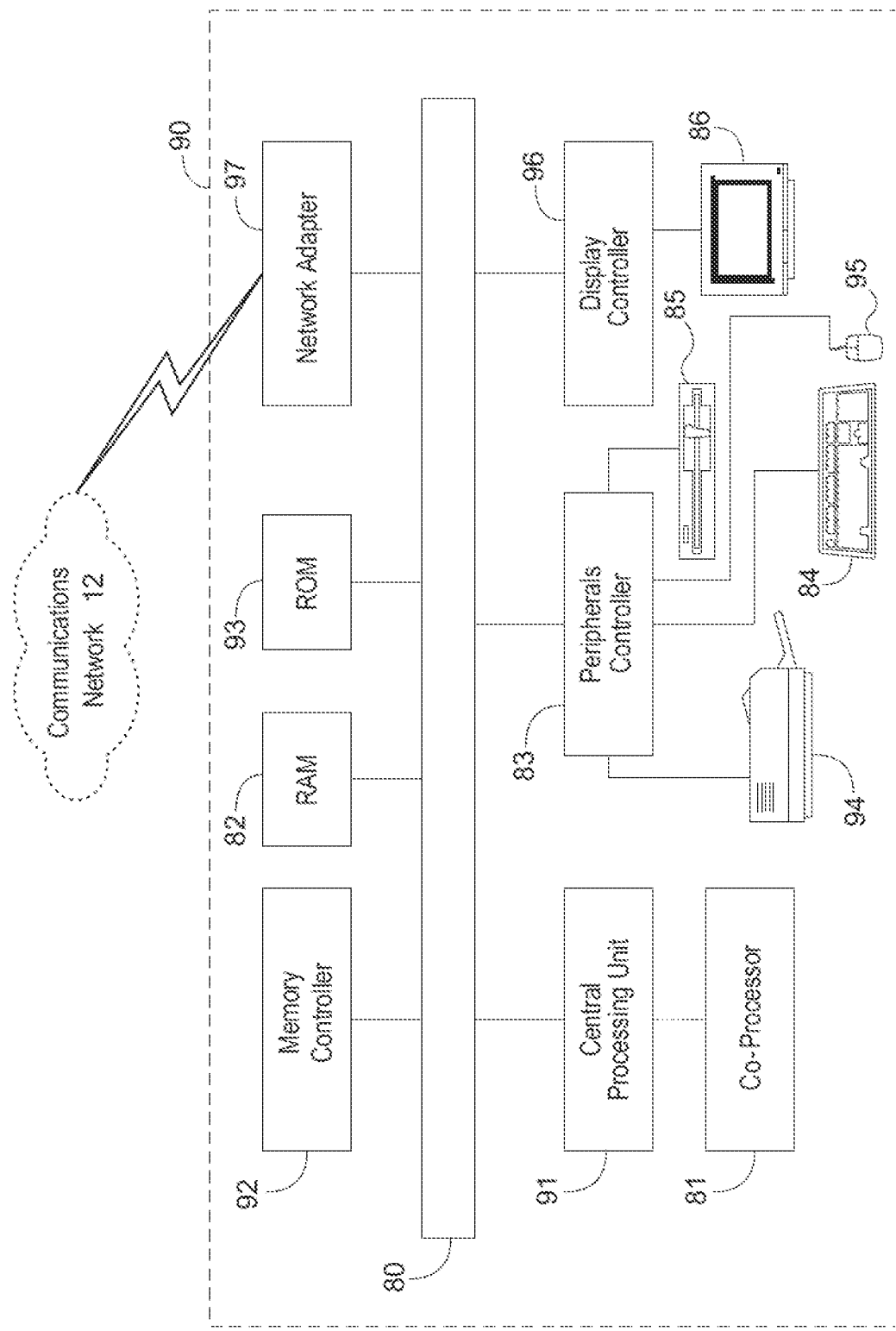
FIG. 14D is a block diagram of a computer system or server that may be used to implement any of the network nodes described herein.

It is understood that the entities performing the steps illustrated in FIGS. 9-10 are logical entities that may be implemented in the form of software (i.e., computer-executable instructions) stored in a memory of, and executing on a processor of, a network node or computer system such as those illustrated in FIG. 14C or FIG. 14D. That is, the method(s) illustrated in FIGS. 9-10 may be implemented in the form of software (i.e., computer-executable instructions) stored in a memory of a network node, such as the node or computer system illustrated in FIG. 14C or FIG. 14D, which computer executable instructions, when executed by a processor of the node, perform the steps illustrated in FIGS. 9-10. It is also understood that any transmitting and receiving steps illustrated in FIGS. 9-10 may be performed by communication circuitry of the node under control of the processor of the node and the computer-executable instructions (e.g., software) that it executes.

oneM2M Embodiment

The following sections show how the new parameters described above may be applied in oneM2M embodiments. In later sections, we describe specific examples of messages with details of the resulting functionality, processing and results.

This section describes a solution for an oneM2M embodiment of the enhancements.

Table 4 depicts the oneM2M request parameter list detailed earlier, together with the newly introduced parameter (FilterBase, Composite Result, and ExceptionHandling) and possible changes in usage of the other parameters.

Table 5 depicts the corresponding oneM2M FilterCriteria list together with newly introduced parameters for the FilterCriteria.

Both tables highlight also possible modifications and clarifications to be brought to the usage of the existing parameters.

For the solutions described below the presence of the FilterBase parameter is the indicator of enhanced functionality. The discovery functionality described in oneM2M-TS-0001, oneM2M Functional Architecture V2.1.0 and uses another parameter, namely filterUsage, as indicator that a RETRIEVE operation should be used for discovery. FilterBase existence may be a better indicator for using FilterCriteria for the existing, RETRIEVE-based discovery operation as well. However either method would work for this purpose.

TABLE 4

Request Parameter List

| Request Parameter | Criticality | Description |
| --- | --- | --- |
| (ENHANCED) To | Mandatory | Address of the target resource or target attribute for the operation. When FilterBase present this is a relative path, this path will be concatenated with the addresses of the resources in the Filtering Results in order to determine the addresses of the resources in the Target. Resource Set for the RESTful operation. Otherwise this is an absolute path. |
| From | Mandatory | Identifier representing the Originator |
| Operation | Mandatory | Operation to be executed: Create (C), Retrieve (R), Update (U), Delete (D), Notify (N). |
| Request Identifier | Mandatory | ID enabling tracking of Requests and corresponding Responses. |

TABLE 4-continued

Request Parameter List

| Request Parameter | Criticality | Description |
| --- | --- | --- |
| Content | Conditional based on Operation: Mandatory for C, U, N, Optional for R | (C) content of the new resource to be created (U) content to be replaced in an existing resource (N) notification information Optional for: (R) list of attributes to be retrieved |
| Resource Type | Conditional, Mandatory for C | Resource type for the resource to be created. |
| Role | Optional | Originator role to be used in role based access control |
| Originating Timestamp | Optional | Originating timestamp of when the message was built. |
| Request Expiration Timestamp | Optional | Indicates when the request messages (including delay-tolerant) should expire |
| Response Expiration Timestamp | Optional | Indicates when the response messages (including delay-tolerant) should expire |
| Response Type | Optional | Indicates what type of response shall be used. Options are: nonBlockingRequestSynch, nonBlockingRequestAsynch, blockingRequest |
| Result Content | Optional | Indicates what the expected components of the result are. Options are: attributes, hierarchical-address, hierarchical-address+attributes, attributes + child-resources, child-resources, attributes + child-resource-references, child-resource-references, nothing, original-resource (NEW) Note: The newly introduced Composite Result parameter might be implemented independently, or merged with Result Content, in which case some modifications of its use might be specified. |
| Result Persistence | Optional | Indicates the duration for which the address containing the responses is to persist. |
| Operation Execution Time | Optional | Indicates the time when the specified operation is to be executed by the target CSE |
| Event Category | Optional | Indicates the event category that should be used to handle this request in transit, such as immediate, bestEffort, latest |
| Delivery Aggregation | Optional | Enables aggregation of one or more request for delivery to the same CSE(s), depending on policies |
| Group Request Identifier | Optional | Identifier optionally added to group requests that is to be fanned out, in order to detect loops and avoid duplicated operations. |
| Filter Criteria | Optional | Conditions for filtered retrieve operation are described in the next section. It is used for resource discovery and general retrieve, update, delete requests. (NEW) Note: filterUsage may no longer be needed to indicate a discovery procedure |
| Discovery Result Type | Optional | Indicates the preference of the Originator for the format of returned information in the result of the operation. Options are: Hierarchical addressing, non-hierarchical addressing |
| (NEW)FilterBase | Optional | Address of the root where the discovery begins on Hosting CSE, Choices: FilterCSEBase, Exact URI to be used as filtering base. If not present, the processing follows current specifications for regular operations, where some filtering is supported for some of the operations. |
| (NEW)Composite Result | Optional | Indicates what the expected components of the result are. Choices based on new functionality: FilteringResult, OperationResult, Nothing Note: This parameter might be implemented independently, or merged with Result Content above, insuring that all necessary choices are available. |
| (NEW) ExceptionHandling: | Optional | Indicates handling of certain exceptions. Choices: UpdateExistingName, IgnoreExistingName. If not present, the default exception handling occurs (see oneM2M-TS-0001, oneM2M Functional Architecture V2.1.0) |

TABLE 5 oneM2M FilterCriteria List

| Search Parameter | Criterion met if |
| --- | --- |
| createdBefore | The Matched Resource was created before createdBefore |
| createdAfter | The Matched Resource was created after createdBefore |
| modifiedSince | The Matched Resource has been modified since modifiedSince |
| unmodifiedSince | The Matched Resource has not been modified since unmodifiedSince |
| stateTagSmaller | The Matched Resource has stateTag attribute smaller than stateTagSmaller |
| stateTagBigger | The Matched Resource has stateTag attribute larger than stateTagBigger |
| expireBefore | The Matched Resource has expirationTime attribute before expireBefore |
| expireAfter | The Matched Resource has expirationTime attribute after expireAfter |
| labels | The Matched Resource has labels attribute matching labels search parameter. The labels are tokens used as keys for discovery purposes |
| resource Type | The Matched Resource is of type resourceType |
| sizeAbove | The Matched Resource is a <contentInstance> resource and its contentSize attribute is equal to or greater than the sizeAbove value |
| sizeBelow | The Matched Resource is a <contentInstance> resource and its contentSize attribute is smaller than the sizeBelow value |
| contentType | The Matched Resource is a <contentInstance> resource and its contentInfo attribute matches the contentType value |
| attribute | The Matched Resource has the corresponding matching resource attribute |
| (NEW) childResourceType | The Matched Resource has to have a child resource of this type |
| (NEW) childResourceName | The Matched Resource has to have a child resource with this name |
| (NEW) childLabels | The Matched Resource has to have a child resource with a label matching the given value |
| (NEW) childAttribute | The Matched Resource has to have a child resource with an attribute matching the given value |
| (NEW) parentResourceType | The Matched Resource has to have a resource of this type as its parent |
| (NEW) parentResourceName | The Matched Resource has to have a resource with this name as its parent |
| (NEW) parentLabels | The Matched Resource has to have a resource with a label matching the given value as its parent |
| (NEW) parentAttribute | The Matched Resource has to have a resource with an attribute matching the given value as its parent |

| Filter criteria (others) | Role: |
| --- | --- |
| limit | This parameter is not used as search criterion, rather as in formatting/ limiting the way the search result is returned |
| filterUsage | This parameter is not used as search criterion, rather for indicating the use of the filter criteria for discovery purposes NOTE: this parameter might not be used to indicate a discovery procedure, if that indication is provided by the existence of filterBase |
| (NEW) returnRelativeRelationship | The resources composing the Filtering Result may have the following relationship with the Matches Resource: Self, Parent, Semantics, Subscription, Latest, Oldest |
| (NEW) formGroup | Form a group based on filterCriteria Options: MatchedResources, ReturnedResources, OperationResult. |
| (NEW) groupID | If formGroup is present, a groupID might be indicated by the Originator. If formGroup is not present this parameter is ignored |

This section uses the oneM2M embodiment and parameter descriptions provided in the previous section and provides usage examples based on different configurations. Not all possible permutations have been exemplified.

In these following examples, as a pre-requisite, the Originator 402 knows the relative path to be used in the To parameter, generally based on a prior discovery procedure. This corresponds with the use of these enhanced operations in numerous use cases in which the Originator 402 has performed certain discovery and CRUD operations many times, so there is prior knowledge of the resource tree structure.

In this case, the filtering request fulfills the role of a search based on information contained in the resources, rather than to discover the resource tree structure. The Enhanced RESTful operations are not meant to replace the existing CRUD operations or resource tree structure discovery function, but to complement them.

Figure 11:
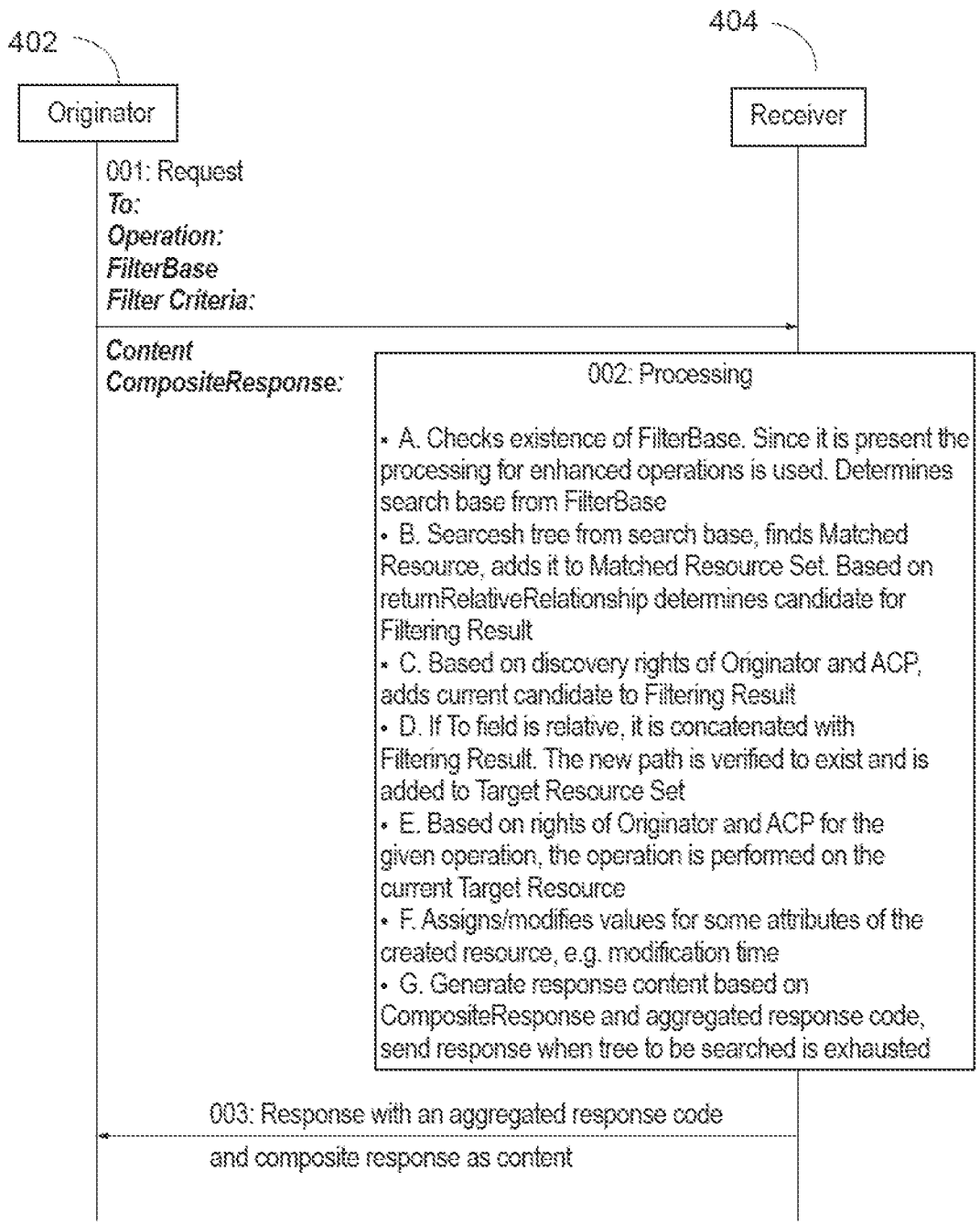
FIG. 11 is a diagram of a generic call flow for the processing examples.

FIG. 11 depicts a generic Request and Response flow. The parameter values specific to each case are detailed in the respective sections.

Example 1: Create Sub Resource to all Resources Found to Meet Attribute Conditions at Two Hierarchical Levels Functionality: Creates a subscription to all newer containers (those created after time "myDate") which are children of AEs with attribute appName==myApp In many cases device applications (AEs) residing on different devices register using the same the appName attribute. A user interested in a specific service from all devices registered to the same CSE can subscribe to all the newer containers created by these services, with the discovery and the subscription creation being performed together.

In step 1 of FIG. 11 for Example 1, a request is sent using the request format:

```
To: CSEBase
Operation: CREATE (C)
FilterBase: FilterCSEBase
  Filter Criteria:
    resourceType==<container>, createdAfter == myDate,
    parentResourceType==<AE>, parentAttribute appName == myApp
    returnRelativeRelationship == Self
Content: <subscription>
ResultContent: hierarchical-address+attributes
CompositeResult: OperationResult
ExceptionHandling: NULL
```

In step 2 of FIG. 11 for Example 1, processing is done with sub-steps 2a-2g.

In step 2a of FIG. 11 for Example 1, the Hosting CSE finds the search base FilterBase i.e. CSEBase In step 2b of FIG. 11 for Example 1, the Hosting CSE searches starting from the search base CSEBase for all resources meeting the conditions (resourceType==<container>, createdAfter==myDate, parentResourceType==<AE>, parentAttribute appName=myApp). It finds CSEBase/AEk/containerX as a Matched Resource.

In step 2c of FIG. 11 for Example 1, based on returnRelativeRelationship==Self, the same resource is a candidate to be added to the Filtering Result, depending on ACP and Originator 402 discovery rights. We assume that the Originator 402 has discovery rights for CSEBase/AEk/containerX In step 2d of FIG. 11 for Example 1, based on the To address not being a relative path, the Target Resource Set is the same as the Filtering Result. The Hosting CSE verifies that the path CSEBase/AEk/containerX is valid for each resource in the Target Resource Set.

In step 2e of FIG. 11 for Example 1, based on ACP and the Originator 402 CREATE rights at CSEBase/AEk/containerX the Hosting CSE performs the CREATE operation of a <subscription> resource. We assume the Originator 402 has create rights. Based on ExceptionHandling: NULL no special handling of the RESTful operation is needed.

In step 2f of FIG. 11 for Example 1, the Hosting CSE may assign values for some attributes of the created resource, as mandated by the regular operation requirements In step 2g of FIG. 11 for Example 1, the Hosting CSE generates the Composite Response Code and the response content. Based on CompositeResult i.e. OperationResult and ResultContent: hierarchical-address+attributes the result content will contain the addresses of all the subscription resources created, i.e. SEBase/AEk/containerX/subscription and their attributes

Example 2: Create Sub Resource to a Specific Child of Each Matched Resource, Matches Based on Filters at Two Hierarchically Relative Levels (Parent and Child)

Functionality: Given an application AE1 that forms a container for temperature readings from many platforms/sensors, so there may be several nested as well as parallel containers included. Find all the measurement storing containers who have ZigBee temperature information, as described by the container's ontologyRef pointing to the ZigBee temperature sensor ontology. Then create a subscription to the semantic description resource of the filtering result to monitor semantic description changes. Returns the hierarchical addresses of the subscription resources created.

In step 1 of FIG. 11 for Example 2, a request is sent using the request format:

```
To: CSEBase
Operation: CREATE (C)
FilterBase: /CSEBase/AE1
Filter Criteria:
  parentType == <container>, resourceType == <container>,
  attribute ontologyRef== http://[ZigBeeOntology]#TemperatureSensor
  returnRelativeRelationship == Semantics
Content: <subscription>
ResultContent: hierarchical-address
CompositeResult: OperationResult
ExceptionHandling: NULL
```

In step 2 of FIG. 11 for Example 2, processing sub-steps 2a-2g are done.

In step 2a of FIG. 11 for Example 2, the Hosting CSE finds the search base i.e. FilterBase=/CSEBase/AE1

In step 2b of FIG. 11 for Example 2, the Hosting CSE searches starting from the search base/CSEBase/AE1 for all resources meeting the conditions (parentType==<container>, resourceType==<container>, attribute ontologyRef, http://VigBeeOntologyYtTemperatureSensor) and will find all matching containers i.e. finds all . . . /containerK matching(which may be at various levels in the tree based at /CSEBase/AE1)

In step 2c of FIG. 11 for Example 2, based on returnRelativeRelationship==Semantics, the . . . /containerK/semanticDescriptor resource is a candidate to be added to the Filtering Result, depending on ACP and the Originator 402 discovery rights. We assume that the Originator 402 has discovery rights In step 2d of FIG. 11 for Example 2, based on the To address not being a relative path, the Target Resource Set is the same as the Filtering Result. The Hosting CSE verifies that the path to . . . /containerK/semanticDescriptor is valid for each result in the Target Resource Set.

In step 2e of FIG. 11 for Example 2, based on ACP and the Originator 402 CREATE rights at . . . /containerK/semanticDescriptor the Hosting CSE performs the CREATE operation of a <subscription> resource. We assume the Originator 402 has create rights.

In step 2f of FIG. 11 for Example 2, the Hosting CSE may assign values for some attributes of the created resource, as mandated by the regular operation requirements In step 2g of FIG. 11 for Example 2, the Hosting CSE generates the Composite Response Code and the response content. Based on CompositeResult i.e. OperationResult and ResultContent: hierarchical-address the result content will contain the addresses of all the subscription resources created, i.e. /containerK/semanticDescriptor/subscription without the attributes

Example 3: Updates an Attribute for all Resources with a Given Relation to the Resources in the Filtering Result Functionality: Finds all the devices (AEs) with location containers updated recently (that is since time "myTime"), then updates a label on the tempMeasurement container known to be present in all these AEs for future filtering of only those tempMeasurement resources. This functionality effectively discovers the devices with newly updated locations, and at the same time it labels the measurement containers to be easily discoverable for easy future identification.

In step 1 of FIG. 11 for Example 3, a request is sent using the request format:

```
To: .../tempMeasurement
Operation: UPDATE (U)
FilterBase: FilterCSEBase
Filter Criteria:
    parentResourceType== <AE>, resourceType== <container>,
    resourceName == locationContainer, modifiedSince == myTime
    returnRelativeRelationship == Parent
Content: labels=tempSensorMoved
ResultContent: nothing
CompositeResult: OperationResult
ExceptionHandling: NULL
```

In step 2 of FIG. 11 for Example 3, processing sub-steps 2a-2g are done.

In step 2a of FIG. 11 for Example 3, the Hosting CSE finds the search base FilterBase=CSEBase In step 2b of FIG. 11 for Example 3, the Hosting CSE searches starting from the search base CSEBase for all resources meeting the conditions (parentResourceType==<AE>, resourceType==<container>, resourceName==locationContainer, modifiedSince==myTime).

It will find the corresponding locationContainercontainers as Matched Resources: CSEBase/AEk/locationContainer.

Based on returnRelativeRelationship==Parent each CSEBase/AEk becomes a candidate for Filtering Result In step 2c of FIG. 11 for Example 3, for each iteration, depending on ACP and the Originator 402 discovery rights at CSEBase/AEk the Hosting CSE adds this resource to the Filtering Result. We assume that the Originator 402 has discovery rights.

In step 2d of FIG. 11 for Example 3, based on To== . . . /tempMeasurement, the Hosting CSE forms the Target Resource Set for the UPDATE operation, so the set will be composed of all CSEBase/AEk/tempMeasurement resources The Hosting CSE verifies that the path CSEBase/AEk/tempMeasurement is valid for each resource in the Target Resource Set.

In step 2e of FIG. 11 for Example 3, based on ACP and the Originator 402 UPDATE rights at Base/AEk/locationContainer the Hosting CSE performs the UPDATE operation of the CSEBase/AEk/tempMeasurement resource by updating the labels attribute (i.e. adding "tempSensorMoved"). We assume the Originator 402 has update rights.

In step 2f of FIG. 11 for Example 3, the Hosting CSE may assign values for some attributes of the updated resource, as mandated by the regular operation requirements In step 2g of FIG. 11 for Example 3, the Hosting CSE generates the Composite Response Code and the response content. Based on CompositeResult i.e. OperationResult and ResultContent i.e. Nothing no content is sent back with the response

Example 4: Deletes a Resource Instance Relative to the Matches Found to Meet Conditions at Three Hierarchical Levels Functionality: Finds all the AEs with <container> resources to which a specific destination has subscriptions, then deletes the latest <contentInstance> of the tempMeasurement container.

This may be a case where a subscriber to notifications may be aware that a certain condition occurs (e.g. the latest measurement is known to be invalid) and uses one operation to discover all relevant resources to and delete the latest results.

In step 1 of FIG. 11 for Example 4, a request is sent using the request format:

```
To: CSEBase
Operation: DELETE (D)
FilterBase: FilterCSEBase
Filter Criteria:
    resourceType== <container>, resourceName== tempMeasurement,
    childResourceType == <subscription>, childAttribute notification
    URI == myURI
    parentResourceType== <AE>
    returnRelativeRelationship == Latest
Content: N/A
ResultContent: N/A
CompositeResult: Nothing
ExceptionHandling: NULL
```

In step 2 of FIG. 11 for Example 4, processing sub-steps 2a-2g are done.

In step 2a of FIG. 11 for Example 4, the Hosting CSE finds the search base i.e. FilterBase=CSEBase.

In step 2b of FIG. 11 for Example 4, The Hosting CSE searches starting from the search base CSEBase for all resources meeting the conditions (resourceType==<container>, resourceName==tempMeasurement, childResourceType==<subscription>, childAttribute notificationURI==myURI, parentResourceType==<AE>) so it will find all containers with the corresponding attribute in the Subscription, i.e. finds all CSEBase/AEk/tempMeasurement as Matched Resources. Based on returnRelativeRelationship==Latest, the latest <contentInstance> of each CSEBase/AEk/tempMeasurement is a candidate to the Filtering Result In step 2c of FIG. 11 for Example 4, for each iteration, depending on ACP and Originator 402 discovery rights at CSEBase/AEk/tempMeasurement/latest, the Hosting CSE adds this resource to the Filtering Result. We assume that the Originator 402 has discovery rights.

In step 2d of FIG. 11 for Example 4, based on To==CSEBase the Hosting CSE sets the Target Resource Set for the DELETE operation to be the same as the Filtering Result. The Hosting CSE also verifies that the path CSE- Base/AEk/tempMeasurement/latest is valid for each resource in the Target Resource Set.

In step 2e of FIG. 11 for Example 4, based on ACP and Originator 402 DELETE rights at CSEBase/AEk/tempMeasurement/latest the Hosting CSE performs the DELETE operation of the latest <contentInstance> resource. We assume the Originator 402 has delete rights.

In step 2f of FIG. 11 for Example 4, the Hosting CSE generates the Composite Response Code. Based on CompositeResult==Nothing, no content needs to be included in the response. When the tree search is exhausted it generates the response to the Originator 402

In oneM2M oneM2M-TS-0001, oneM2M Functional Architecture V2.1.0 an operation targeting virtual resource <container>/latest is applied to the latest instantiation of the <contentInstance> child of the <container> resource. Therefore in this example, an operation on CSEBase/AEk/tempMeasurement/latest is executed on a <contentInstance> resource Example 5: Uses exceptionHandling to Selectively Create or Update Resources Relative to the Resources in the Filtering Result and Creates a Group for Future Use Functionality: Finds all the devices (AEs) with location containers updated recently (that is since time "myTime"), then creates or updates the subscription to a specific container. A group of the matched resources is formed for possible future use.

This functionality may be used to discover the devices with newly updated locations and update subscriptions with a new notification target, or create new subscriptions. At the same time it forms a group of the locationContainer sub resources for future use, e.g. to request future location updates to all as a group.

In step 1 of FIG. 11 for Example 5, a request is sent using the request format:

```
To: .../tempMeasurement
Operation: CREATE (C)
FilterBase: FilterCSEBase
Filter Criteria: parentResourceType== <AE>, resourceType == <container>,
    resourceName == locationContainer, modifiedSince == myTime
    returnRelativeRelationship == Parent
    formGroup == MatchedResources
    groupID: 35
Content: <mySubcription>
ResultContent: nothing
CompositeResult: OperationResult
ExceptionHandling: UpdateExistingName
```

Note:
The current oneM2M CREATE procedure specifies in oneM2M-TS-0001, oneM2M Functional Architecture V2.1.0 section 10.1.1.1 for processing at the receiver 404:

"Verify that the name for the created resource as suggested as the resourceName attribute in Content parameter, if provided by the Originator 402 in the CREATE Request message, does not already exist among child resources of the target resource. If no child within the targeted resource exists with the same resourceName as suggested by the Originator 402, use that name for the resource to be created. If a child uses the resourceName already, the Receiver 404 assign a new name which shall be returned to the Originator 402. If the name was not suggested by the Originator 402, assign a name generated by the Receiver 404 to the resource to be created."

By using the ExceptionHandling: UpdateExistingName the Receiver 404 can be instructed to modify this default behavior as follows:

If ExceptionHandling indicates UpdateExistingName and a child uses the resourceName already, the Receiver 404 does not generate a new name and does not create a new resource. Instead, the Receiver 404 proceeds with executing an Update operation on the existing child resource, using the given Content. If ExceptionHandling is NULL or empty the default processing occurs.

In step 2 of FIG. 11 for Example 5, processing sub-steps 2a-2g are done.

In step 2a of FIG. 11 for Example 5, the Hosting CSE finds the search base FilterBase=CSEBase In step 2b of FIG. 11 for Example 5, the Hosting CSE searches starting from the search base CSEBase for all resources meeting the conditions (parentResourceType==<AE>, resourceType==<container>, resourceName locationContainer, modifiedSince==myTime).

It will find the corresponding locationContainer containers as Matched Resources: CSEBase/AEk/locationContainer.

Based on formGroup==MatchedResources and groupID: 35 the Hosting CSE forms a group with groupID 35 and adds each CSEBase/AEk/locationContainer Matched Resource to the group as it is found.

Based on returnRelativeRelationship==Parent each CSEBase/AEk becomes a candidate for Filtering Result In step 2c of FIG. 11 for Example 5, for each iteration, based on ACP and the Originator 402 CREATE rights at CSEBase/AEk the Hosting CSE adds this resource to the Filtering Result. We assume that the Originator 402 has discovery rights.

In step 2d of FIG. 11 for Example 5, based on To== . . . /tempMeasurement the Hosting CSE knows that the CREATE operation needs to be performed on CSEBase/AEk/tempMeasurement The Hosting CSE verifies that the path CSEBase/AEk/tempMeasurement is valid for each resource in the Target Resource Set In step 2e of FIG. 11 for Example 5, based on ACP and the Originator 402 create rights at CSEBase/AEk/tempMeasurement the Hosting CSE performs the CREATE operation of the <mySubcription> resource. We assume the Originator 402 has update rights.

Based on ExceptionHandling: UpdateExistingName, if a subscription resource named <mySubscription> exists, the Hosting CSE updates the existing <mySubscription> resource.

Figure 12A:
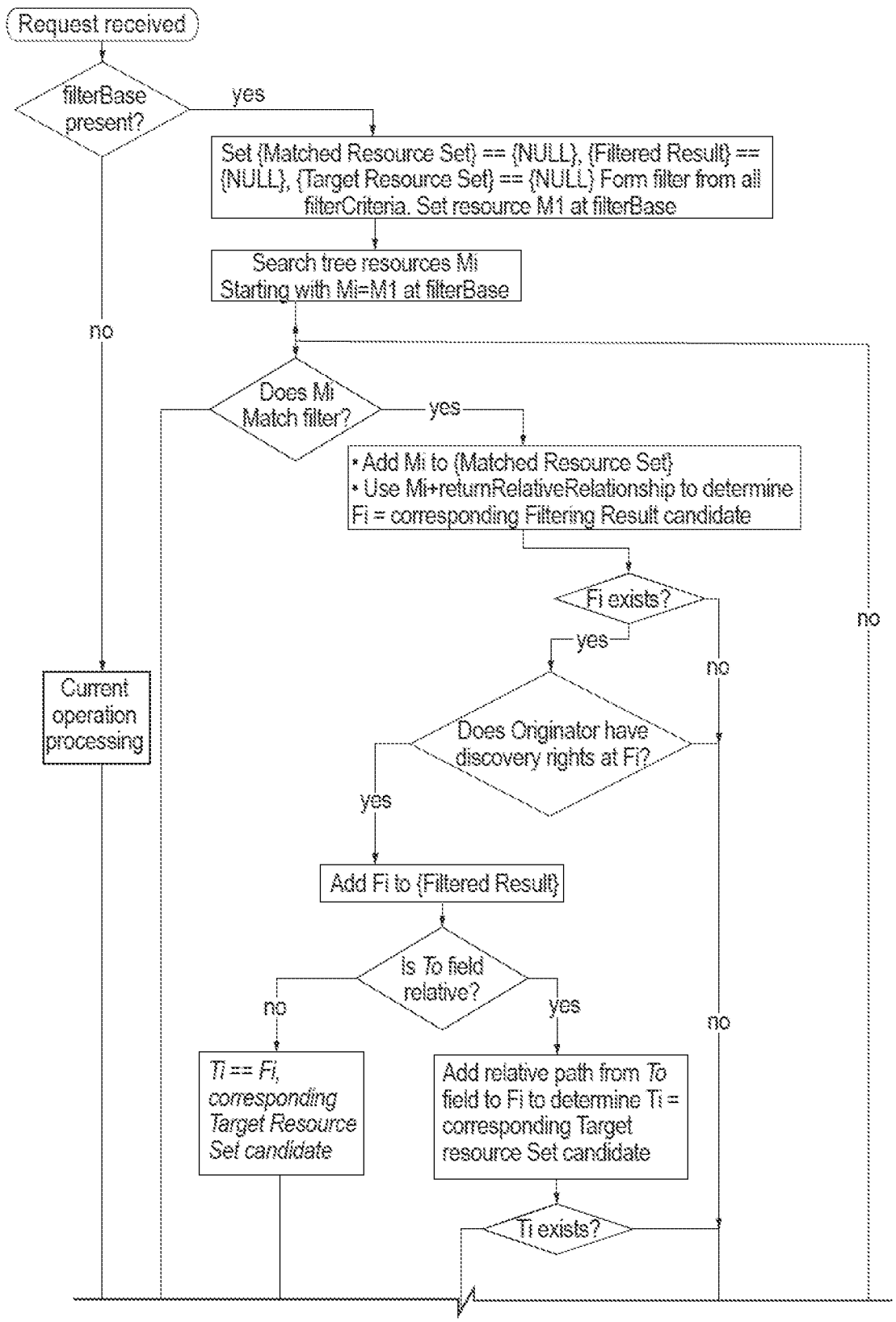
FIG. 12A-B is a diagram of a request processing flow chart.
Figure 12B:
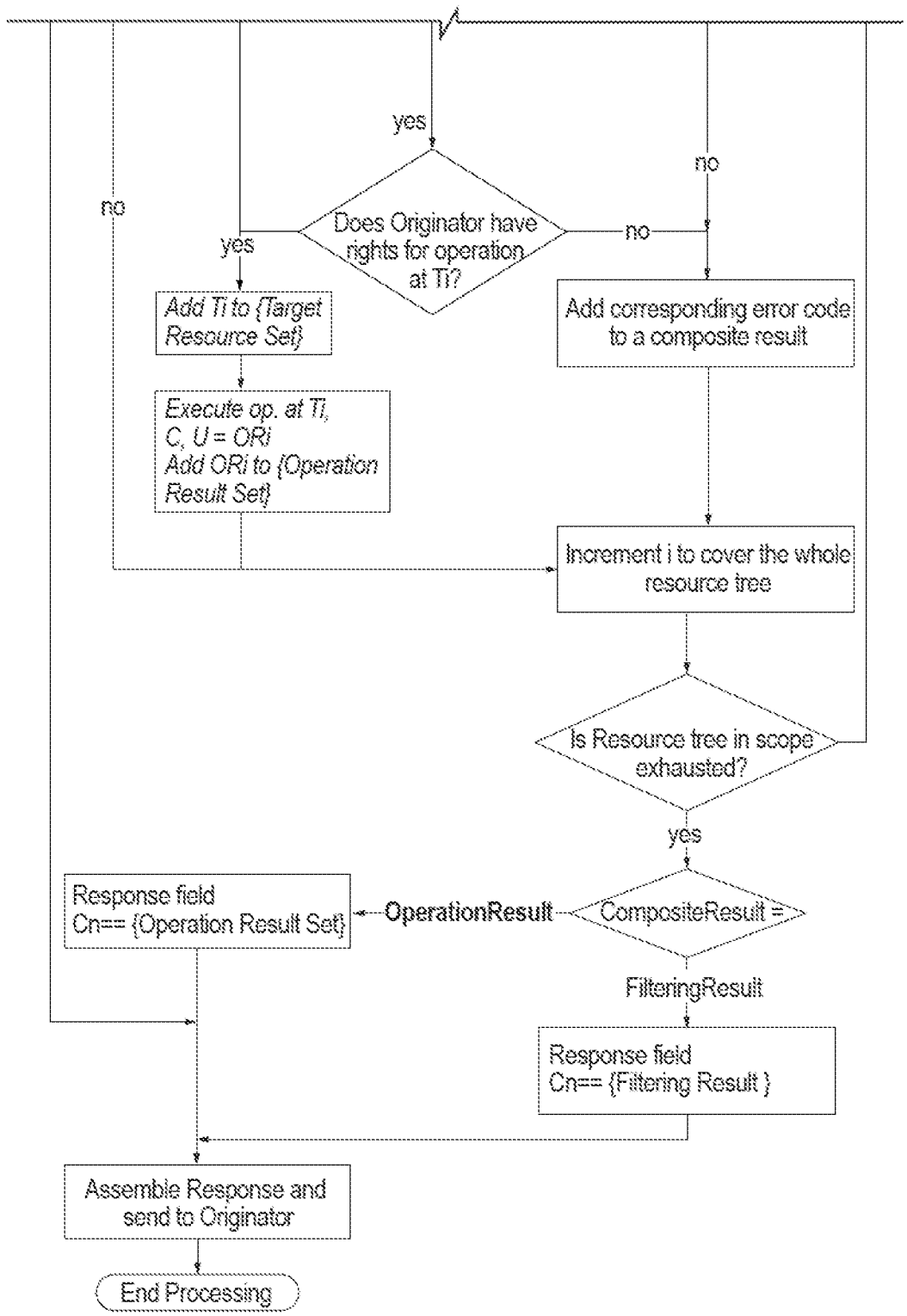

In step 2f of FIG. 11 for Example 5, the Hosting CSE may assign values for some attributes of the updated resource, as mandated by the regular operation requirements In step 2g of FIG. 11 for Example 5, the Hosting CSE generates the Composite Response Code and the response content. Based on CompositeResult i.e. OperationResult and ResultContent i.e. Nothing no content is sent back with the response FIG. 12A-B illustrates an exemplary request processing flow chart.

It is understood that the entities performing the steps illustrated in FIGS. 11-12 are logical entities that may be implemented in the form of software (i.e., computer-executable instructions) stored in a memory of, and executing on a processor of, a network node or computer system such as those illustrated in FIG. 14C or FIG. 14D. That is, the method(s) illustrated in FIGS. 11-12 may be implemented in the form of software (i.e., computer-executable instructions) stored in a memory of a network node, such as the node or computer system illustrated in FIG. 14C or FIG. 14D, which computer executable instructions, when executed by a processor of the node, perform the steps illustrated in FIGS. 11-12. It is also understood that any transmitting and receiving steps illustrated in FIGS. 11-12 may be performed by communication circuitry of the node under control of the processor of the node and the computer-executable instructions (e.g., software) that it executes.

Alternatives to the oneM2M Embodiment.

This section describes an alternate solution to the one described above. First we present alternatives to the request parameters, followed by some to the filter criteria.

In this section some of the new attributes described above are implemented using several different fields/parameters, while using the same oneM2M request format as starting point. While the implementation is different, the addressed problem and use case are the same.

Multiple, Logically Nested Filter Criteria

New parameters for this solution are highlighted in Table 6, along with possible modifications and clarifications to be brought to the usage of the existing parameters. In this example, we show an example for use of 3 different filter criteria parameters in the request, two or more would work similarly

TABLE 6 oneM2M Request Parameter List for Multiple filterCriteria

| Request Parameter | Criticality | Description |
| --- | --- | --- |
| To | Mandatory | Address of the target resource or target attribute for the operation EW) Note: when FilterBase present this may be a relative path |
| From | Mandatory | Identifier representing the Originator |
| Operation | Mandatory | Operation to be executed: Create (C), Retrieve (R), Update (U), Delete (D), Notify (N). |
| Request Identifier | Mandatory | ID enabling tracking of Requests and corresponding Responses |
| Content | Conditional based on Operation: Mandatory for C, U, N Optional for R | (C) content of the new resource to be created (U) content to be replaced in an existing resource (N) notification information Optional for: (R) list of attributes to be retrieved |
| Resource type | Conditional, Mandatory for C | Resource type for the resource to be created. |
| Role | Optional | Originator role to be used in role based access control |
| Originating Timestamp | Optional | Originating timestamp of when the message was built. |
| Request Expiration Timestamp | Optional | Indicates when the request messages (including delay-tolerant) should expire |
| Response Expiration Timestamp | Optional | Indicates when the response messages (including delay-tolerant) should expire |
| Response type | Optional | Indicates what type of response shall be used. Options are: nonBlockingRequestSynch, nonBlockingRequestAsynch, blockingRequest |
| Result Content | Optional | Indicates what the expected components of the result are. Options are: attributes, hierarchical-address, hierarchical-address+attributes, attributes+child-resources, child-resources, attributes+child-resource-references, child-resource-references, nothing, original-resource |
| Result Persistence | Optional | Indicates the duration for which the address containing the responses is to persist. |
| Operation Execution Time | Optional | Indicates the time when the specified operation is to be executed by the target CSE |
| Event Category | Optional | Indicates the event category that should be used to handle this request in transit, such as: immediate, bestEffort, latest |
| Delivery Aggregation | Optional | Enables aggregation of one or more request for delivery to the same CSE(s), depending on policies |
| Group Request Identifier | Optional | Identifier optionally added to group requests that is to be fanned out, in order to detect loops and avoid duplicated operations. |
| (NEW) Filter Criteria 1 | Optional | Primary conditions for filtered operations. Usage described by Table 5. If empty, no filtering is used by the Receiver in processing the request. |
| (NEW) Filter Criteria 2 | Optional | Secondary conditions for filtered operations. Usage described by Table 5. If empty, only filtering based on Filter Criteria 1 is used by the Receiver in processing the request. |

TABLE 6-continued oneM2M Request Parameter List for Multiple filterCriteria

| Request Parameter | Criticality | Description |
| --- | --- | --- |
| NEW) Filter Criteria 3 | Optional | Tertiary conditions for filtered operations. Usage described by Table 5. If empty, only filtering based on Filter Criteria 1 and 2 is used by the Receiver in processing the request. |
| Discovery Result Type | Optional | Indicates the preference of the Originator for the format of returned information in the result of the operation. Options are: Hierarchical addressing, non-Hierarchical addressing |
| (NEW FilterBase | Optional | Address of the root where the discovery begins on Hosting CSE, Choices: FilterCSEBase, Exact URI to be used as filtering base. If not present, no filtering is done. |

When Multiple Nested Filter Criteria are used, the Hosting CSE performs step 0002 of the flow in FIG. 11 as follows:

```
If (Filter Criteria 1 exists)
{
  Hosting CSE searches starting from the search base FilterBase for all resources meeting FilterCriteria 1, forms Filtering Result 1
  If (Filter Criteria 2 exists)
  {
    Hosting CSE searches starting from Filtering Result 1 for all resources meeting FilterCriteria 2, forms Filtering Result 2
    If (Filter Criteria 3 exists)
    {
      Hosting CSE searches starting from Filtering Result 2 for all resources meeting FilterCriteria 3, forms Filtering Result 3 == final filtering Result
    }
  }
}
```

Multiple Filter Criteria Applied at Different Hierarchy Levels

The new parameters for this solution are highlighted in Table 7 along with possible modifications and clarifications to be brought to the usage of the existing parameters. In this example we show an example for use of 3 different filter criteria parameters in the request, two or more would work similarly

TABLE 7 oneM2M Request Parameter List for Multiple filterCriteria levels

| Request Parameter | Criticality | Description |
| --- | --- | --- |
| To | Mandatory | Address of the target resource or target attribute for the operation (NEW) Note: when FilterBase present this may be a relative path |
| From | Mandatory | Identifier representing the Originator |
| Operation | Mandatory | Operation to be executed: Create (C), Retrieve (R), Update (U), Delete (D), Notify (N). |
| Request Identifier | Mandatory | ID enabling tracking of Requests and corresponding Responses |
| Content | Conditional based on Operation: Mandatory for C, U, N Optional for R | (C) content of the new resource to be created (U) content to be replaced in an existing resource (N) notification information Optional for: (R) list of attributes to be retrieved |
| Resource type | Conditional, Mandatory for C | Resource type for the resource to be created. |
| Role | Optional | Originator role to be used in role based access control |
| Originating Timestamp | Optional | Originating timestamp of when the message was built. |
| Request Expiration Timestamp | Optional | Indicates when the request messages (including delay-tolerant) should expire |
| Response Expiration Timestamp | Optional | Indicates when the response messages (including delay-tolerant) should expire |
| Response type | Optional | Indicates what type of response shall be used. Options are: nonBlockingRequestSynch, nonBlockingRequestAsynch, blockingRequest |
| Result Content | Optional | Indicates what the expected components of the result are. Options are: attributes, hierarchical-address, hierarchical-address+attributes, attributes+child-resources, child-resources, attributes+child-resource-references, child-resource-references, nothing, original-resource |

TABLE 7-continued oneM2M Request Parameter List for Multiple filterCriteria levels

| Request Parameter | Criticality | Description |
|---|---|---|
| Result Persistence | Optional | Indicates the duration for which the address containing the responses is to persist. |
| Operation Execution Time | Optional | Indicates the time when the specified operation is to be executed by the target CSE |
| Event Category | Optional | Indicates the event category that should be used to handle this request in transit, such as: immediate, bestEffort, latest |
| Delivery Aggregation | Optional | Enables aggregation of one or more request for delivery to the same CSE(s), depending on policies |
| Group Request Identifier | Optional | Identifier optionally added to group requests that is to be fanned out, in order to detect loops and avoid duplicated operations. |
| (NEW) BaseFilterCriteria | Optional | Conditions for filtered operations. Usage described by Table 3 as it applies to FilterBase. If empty, no filtering is used by the Receiver in processing the request. |
| (NEW) ChildFilterCriteria | Optional | Conditions for filtered operations. Usage described by Table 3 as it applies to the children of the resources matched by BaseFilterCriteria. If empty, only filtering based on BaseFilterCriteria and, if present, ParentFilterCriteria is used by the Receiver in processing the request. |
| (NEW) ParentFilterCriteria | Optional | Conditions for filtered operations. Usage described by Table 3 as it applies to the parents of the resources matched by BaseFilterCriteria. If empty, only filtering based on BaseFilterCriteria and, if present, ChildFilterCriteria is used by the Receiver in processing the request. |
| Discovery Result Type | Optional | Indicates the preference of the Originator for the format of returned information in the result of the operation. Options are: Hierarchical addressing, non-Hierarchical addressing |
| (NEW) FilterBase | Optional | Address of the root where the discovery begins on Hosting CSE, Choices: FilterCSEBase, Extract URI to be used as a filtering base. If not present no filtering is done. |

When Multiple Level Filter Criteria are used, the Hosting CSE performs step 0002 of the flow in FIG. 11 as follows:

```
If (BaseFilterCriteria NOT NULL)
{
  Hosting CSE searches starting from the search base FilterBase
  While (Resource X meets BaseFilterCriteria)
  {
    If ( (ChildFilterCriteria NOT NULL) AND (child Y of resource X
    meets ChildFilterCriteria) )
    OR (ChildFilterCriteria == NULL)
    {
      If ( (ParentFilterCriteria NOT NULL) AND (Parent Z of resource X
      meets ParentFilterCriteria) )
      OR (ParentFilterCriteria == NULL)
      {
        Resource X = matchCandidate
        Hosting CSE adds Resource X to Filtering Result
      }
    }
  } do search through the tree
}
```

Additional Filter Criteria Search Parameters

The parameters of Table 8 may be used in addition to those discussed above.

TABLE 8

Additional FilterCriteria

| Search Parameter | Resource matching if: |
|---|---|
| (NEW) latestCreatedBefore | The Matched Resource is a container whose latest <contentInstance> was created before createdBefore |
| (NEW) latestCreatedAfter | The Matched Resource is a container whose latest <contentInstance> was created before createdAfter |
| (NEW) latestModifiedSince | The Matched Resource is a container whose latest <contentInstance> was created before modifiedSince |
| (NEW) latestUnmodifiedSince | The Matched Resource is a container whose latest <contentInstance> was created before unmodifiedSince |
| (NEW) latestStateTagSmaller | The Matched Resource is a container whose latest <contentInstance> has stateTag attribute smaller than stateTagSmaller |

TABLE 8-continued

Additional FilterCriteria

| Search Parameter | Resource matching if: |
|---|---|
| (NEW) latestStateTagBigger | The Matched Resource is a container whose latest <contentInstance> has stateTag larger than StateTagBigger |
| (NEW) latestSizeAbove | The Matched Resource is a container whose latest <contentInstance> has contentSize attribute equal to or greater than the sizeAbove value |
| (NEW) latestSizeBelow | The Matched Resource is a container whose latest <contentInstance> has contentSize attribute smaller than the sizeBelow value |
| (NEW) latestContentType | The Matched Resource is a container whose latest <contentInstance> has contentInfo attribute that matches the contentType value |
| (NEW) oldestCreatedBefore | The Matched Resource is a container whose oldest <contentInstance> was created before createdBefore |
| (NEW) oldestCreatedAfter | The Matched Resource is a container whose oldest <contentInstance> was created before createdAfter |
| (NEW) oldestModifiedSince | The Matched Resource is a container whose oldest <contentInstance> was modified since modifiedSince |
| (NEW) oldestUnmodifiedSince | The Matched Resource is a container whose oldest <contentInstance> was unmodified since unmodifiedSince |
| NEW) oldestStateTagSmaller | The Matched Resource is a container whose oldest <contentInstance> has stateTag attribute smaller than stateTagSmaller |
| NEW) oldestStateTagBigger | The Matched Resource is a container whose oldest <contentInstance> has stateTag attribute larger than stateTagBigger |
| (NEW) oldestSizeAbove | The Matched Resource is a container whose latest <contentInstance> has contentSize attribute equal to or greater than the sizeAbove value |
| (NEW) oldestSizeBelow | The Matched Resource is a container whose latest <contentInstance> has contentSize attribute smaller the sizeBelow value |
| (NEW) oldestContentType | The Matched Resource is a container whose oldest <contentInstance> has contentInfo attribute that matches the contentType value |
| (NEW) parentCreatedBefore | The Matched Resource has to have as a parent a resource created before the given time value. |
| (NEW) parentCreatedAfter | The Matched Resource has to have as a parent a resource created after the given time value. |
| (NEW) parentModifiedSince | The Matched Resource has to have as a parent a resource modified since the given time value. |
| (NEW) parentUnmodifiedSince | The Matched Resource has to have as a parent a resource unmodified since the given time value. |
| (NEW) parentTagSmaller | The Matched Resource has to have as a parent resource with a StateTag smaller than the given value. |
| (NEW) parentTagBigger | The Matched Resource has to have as a parent resource with a StateTag larger than the given value. |
| (NEW) childCreatedBefore | The Matched Resource has to have as a child a resource created before the given time value. |
| (NEW) childCreatedAfter | The Matched Resource has to have as a child a resource created after the given time value. |
| (NEW) childModifiedSince | The Matched Resource has to have as a child a resource modified since the given time value |
| (NEW) childUnmodifiedSince | The Matched Resource has to have as a child a resource unmodified since the given time value |
| (NEW) childStateTagSmaller | The Matched Resource has to have as a child a resource with a StateTag smaller than the given value. |
| (NEW) childStateTagBigger | The Matched Resource has to have as a child a resource with a StateTag larger than the given value. |

User Interface

Figure 13:
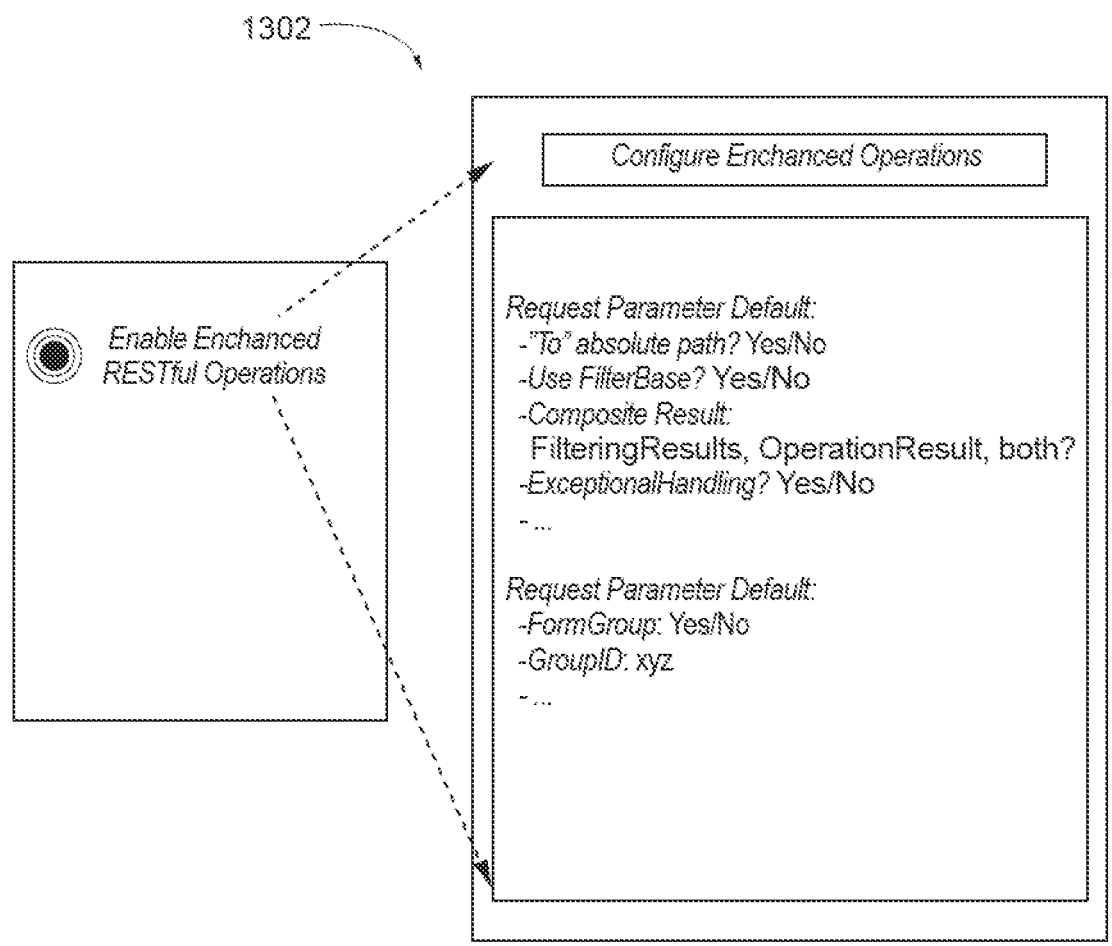
FIG. 13 is a diagram of a Graphical User Interface of one embodiment.

Interfaces, such as Graphical User Interfaces (GUIs), can be used to assist user to control and/or configure functionalities related to Enhanced RESTful operations. FIG. 13 is a diagram that illustrates an interface 1302. Enhanced RESTful operations may be enabled by a user or application to improve communication efficiency, and some of the parameters, listed in Table 4, Table 5, Table 6, Table 7 and Table 8, may also be pre-configured by a user or application for default values as shown in interface 1302. It is to be understood that interface 1302 can be produced using displays such as those shown in FIGS. 14C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 14A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as originator 402, receiver 404, receiver CSE 404', AE_tm 604, MN-CSE1 602 and logical entities to produce interfaces such as interface 1302.

As shown in FIG. 14A, the M2M/IoT/WoT communication system includes a communication network 12. The communication network 12 may be a fixed network (e.g., Ethernet, Fiber, TSDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 14A, the M2M/IoT/WoT communication system may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 14B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as originator 402, receiver 404, receiver CSE 404', AE_tm 604, MN-CSE1 602 and logical entities to produce interfaces such as interface 1302. The M2M service layer 22 may be implemented by one or more servers, computers, devices, virtual machines (e.g. cloud/storage farms, etc.) or the like, including for example the devices illustrated in FIGS. 14C and 14D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 14B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and may include the applications that interact with the UE or gateway and may also be used in conjunction with other disclosed systems and methods.

In one embodiment, the logical entities such as originator 402, receiver 404, receiver CSE 404', AE_tm 604, MN-CSE1 602 and logical entities to produce interfaces such as interface 1302 may be hosted within a M2M service layer instance hosted by an M2M node, such as an M2M server, M2M gateway, or M2M device, as shown in FIG. 14B. For example, the logical entities such as originator 402, receiver 404, receiver CSE 404', AE_tm 604, MN-CSE1 602 and logical entities to produce interfaces such as interface 1302 may comprise an individual service capability within the M2M service layer instance or as a sub-function within an existing service capability.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 14C or FIG. 14D described below.

Further, logical entities such as originator 402, receiver 404, receiver CSE 404', AE_tm 604, MN-CSE1 602 and logical entities to produce interfaces such as interface 1302 can implemented as part of an M2M network that uses a Service Oriented Architecture (SOA) and/or a Resource-Oriented Architecture (ROA) to access services of the present application.

FIG. 14C is a block diagram of an example hardware/software architecture of a M2M network node 30, such as an M2M device 18, an M2M gateway 14, an M2M server, or the like. The node 30 can execute or include logical entities such as originator 402, receiver 404, receiver CSE 404', AE_tm 604, MN-CSE1 602 and logical entities to produce interfaces such as interface 1302. The device 30 can be part of an M2M network as shown in FIG. 14A-B or part of a non-M2M network. As shown in FIG. 14C, the M2M node 30 may include a processor 32, non-removable memory 44, removable memory 46, a speaker/microphone 38, a keypad 40, a display, touchpad, and/or indicators 42, a power source 48, a global positioning system (GP S) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 14C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 14C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 14C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATS, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 14D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as originator 402, receiver 404, receiver CSE 404', AE_tm 604, MN-CSE1 602 and logical entities to produce interfaces such as interface 1302. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 14A and FIG. 14B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 14A-B or the device 30 of FIG. 14 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as originator 402, receiver 404, receiver CSE 404', AE_tm 604, MN-CSE1 602 and logical entities to produce interfaces such as interface 1302 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus for a service providing service capabilities to a plurality of applications via a set of application programming interfaces (APIs), the service being supported as a middleware above an application protocol layer, the apparatus comprising circuitry configured to:

receive a representational state transfer (RESTful) request that comprises a filter criteria and uniform resource identifier (URI) of a target resource hosted at the service;

check whether an originator of the RESTful request has a discovery right for the RESTful request;

query to discover one or more child resources of the target resource that matches the filter criteria, wherein each of the one or more child resources comprise the URI of the target resource and an additional path of the child resource relative to the target resource;

create a group of discovered resources that match the filter criteria, wherein the discovered resources of the group match the filter criteria;

assign a group identifier to the group; and send a RESTful response comprising information indicative of the group.

2. The apparatus recited in claim 1, wherein the circuitry is further configured to:

receive a request indicating a RESTful operation to be performed on the target resource, the RESTful operation being one of a CREATE request, a RETRIEVE request, an UPDATE request, or a DELETE request.

3. The apparatus recited in claim 2, wherein the circuitry is further configured to:

perform the RESTful operation on at least one of the one or more child resources based on the group identifier.

4. The apparatus recited in claim 1, wherein the filter criteria comprises a criteria to identify one or more resources having a matching resource attribute.

5. The apparatus recited in claim 1, wherein the filter criteria comprises a criteria to identify one or more child resources with an attribute matching a given value.

6. The apparatus recited in claim 1, wherein the filter criteria comprises a criteria to identify one or more resources with an attribute matching a given value as its parent resource.

7. A method for a service providing service capabilities to a plurality of applications via a set of application programming interfaces (APIs), the service being supported as a middleware above an application protocol layer, the method comprising:

receiving a representational state transfer (RESTful) request that comprises a filter criteria and uniform resource identifier (URI) of a target resource hosted at the service;

checking whether an originator of the RESTful request has a discovery right for the RESTful request;

querying to discover one or more child resources of the target resource that match the filter criteria, wherein each of the one or more child resources comprise the URI of the target resource and an additional path of the child resource relative to the target resource;

creating a group of discovered resources that match the filter criteria, wherein the discovered resources of the group match the filter criteria;

assigning a group identifier to the group; and sending a RESTful response comprising information indicative of the group.

8. The method recited in claim 7, wherein the method further comprising:

receiving a request indicating a RESTful operation to be performed on the target resource, the RESTful operation being one of a CREATE request, a RETRIEVE request, an UPDATE request, or a DELETE request.

9. The method recited in claim 8, wherein the method further comprising:

performing the RESTful operation on at least one of the one or more child resources based on the group identifier.

10. The method recited in claim 7, wherein the filter criteria comprises a criteria to identify one or more resources having a matching resource attribute.

11. The method recited in claim 7, wherein the filter criteria comprises a criteria to identify one or more child resources with an attribute matching a given value.

12. The method recited in claim 7, wherein the filter criteria comprises a criteria to identify one or more resources with an attribute matching a given value as its parent resource.

* * * * *